US006748858B2

(12) United States Patent
Yamaguchi

(10) Patent No.: US 6,748,858 B2
(45) Date of Patent: Jun. 15, 2004

(54) PRINTING SYSTEM

(75) Inventor: Katsuya Yamaguchi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/035,445

(22) Filed: Jan. 4, 2002

(65) Prior Publication Data

US 2002/0109743 A1 Aug. 15, 2002

(30) Foreign Application Priority Data

Jan. 12, 2001 (JP) ..................................... P2001-005268
Jan. 12, 2001 (JP) ..................................... P2001-005269
Nov. 12, 2001 (JP) ..................................... P2001-346449

(51) Int. Cl.[7] ........................... B41F 13/24; B65H 1/06; G03G 15/00; G06K 3/00; B65B 35/50

(52) U.S. Cl. ....................... 101/232; 101/233; 101/234; 101/236; 101/237; 101/238; 271/176; 271/298; 399/45; 399/389; 399/404; 399/405; 399/403; 400/61; 400/70; 400/76; 400/624; 400/625; 414/785; 414/788

(58) Field of Search ................................ 101/232, 233, 101/234, 236, 237, 238; 400/624, 625, 61, 70, 76; 399/45, 404, 389, 405, 403; 414/786, 788; 271/298, 176

(56) References Cited

U.S. PATENT DOCUMENTS 3,622,150 A * 11/1971 Hayes ......................... 271/68
4,515,464 A * 5/1985 Shigemura et al. ........... 355/14
4,693,590 A * 9/1987 Umeda ........................ 355/14
5,580,045 A * 12/1996 Matsumoto et al. ........ 271/298
5,627,650 A * 5/1997 Nosaki et al. .............. 358/296
5,771,433 A 6/1998 Kimijima
5,822,075 A * 10/1998 Kaneko et al. ............. 358/296
6,000,870 A * 12/1999 Koga ......................... 400/605
6,009,303 A * 12/1999 Kumagai et al. ........... 399/370
6,113,094 A * 9/2000 Horiguchi et al. .......... 271/176
6,118,972 A * 9/2000 Yamazaki et al. .......... 399/370
6,264,189 B1 * 7/2001 Kawata ...................... 271/176
6,305,281 B1 * 10/2001 Aizawa ...................... 101/118
6,452,232 B1 9/2002 Adan
2001/0054790 A1 * 12/2001 Ikeda ......................... 271/213

FOREIGN PATENT DOCUMENTS

KR 2000-0047907 7/2000

* cited by examiner

*Primary Examiner*—Andrew H. Hirshfeld
*Assistant Examiner*—Marvin P Crenshaw
(74) *Attorney, Agent, or Firm*—McDermott, Will & Emery

(57) ABSTRACT

A printing apparatus and a printing method capable of preventing stacks of printed sheets from falling apart which can occur when continuously printing stacks of sheets of different sheet sizes. A printing press is controlled to suspend printing for removal of printed sheets, to change the storage destination of the printed sheets or to change printing order, based on a result of sequential or simultaneous comparisons between print sizes of a plurality of print data and a previously determined permissible limit.

17 Claims, 18 Drawing Sheets

FIG. 3

| | FULL SIZE/2 | FULL SIZE/3 | FULL SIZE/4 | FULL SIZE/5 |
|---|---|---|---|---|
| A SERIES | (x,y)=(40,60) | (x,y)=(30,50) | (x,y)=(20,30) | (x,y)=(10,10) |
| B SERIES | (x,y)=(40,55) | (x,y)=(30,45) | (x,y)=(20,35) | (x,y)=(10,15) |
| USER-SPECIFIED | (x,y)=(50,50) | (x,y)=(40,40) | (x,y)=(30,30) | (x,y)=(20,20) |

FIG. 13A
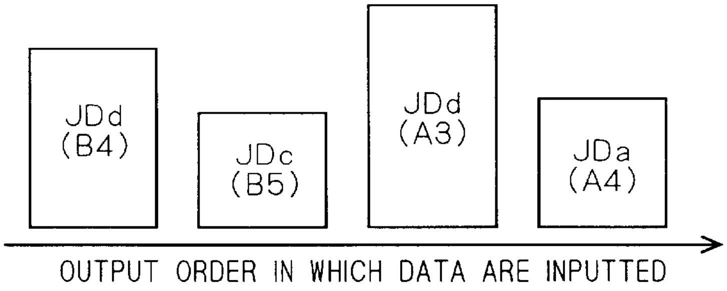
FIG. 13B
| | |
|---|---|
| 1 | JDa |
| 2 | JDb |
| 3 | JDc |
| 4 | JDd |
FIG. 13C
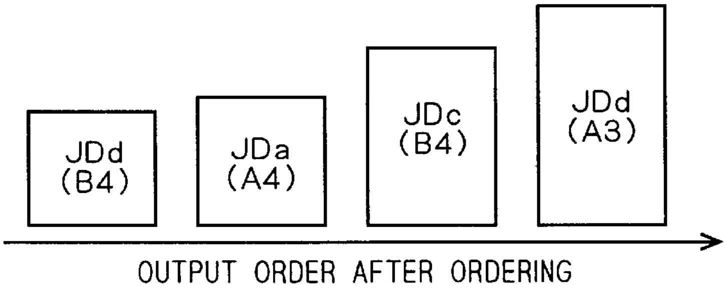
FIG. 13D
| | |
|---|---|
| 1 | JDb |
| 2 | JDc |
| 3 | JDa |
| 4 | JDd |

PRINTING SYSTEM

BACKGROUND OF THE INVENTION

1. Field of the Invention

The present invention relates to a printing system for direct printing using digital data.

2. Description of the Background Art

In a printing press for printing a large number of products, printed sheets are ejected into a stocker attached to the printing press and then transported for post-processing such as a bookbinding process.

The printing press is capable of printing on sheets of paper having a variety of sizes. When the stocker receives an accumulation of printed sheets of difference sizes, for example, by the ejection of a large number of A4 printed sheets followed by a large number of A3 printed sheets, a sheet stack falling apart accident is liable to occur in the stocker.

To prevent such an accident, it is desirable to do printing on successive sheets of as uniform sizes as possible when printed sheets are to be accumulated. The uniformity of the sizes of the sheets prevents the occurrence of the sheet stack falling apart even in the case of the accumulation of a large number of printed sheets in the stocker.

To prevent the sheet stack falling apart accident, there has been a printing press having the function of prompting a user to remove previously printed sheets, if accumulated in the stocker, out of the stocker before printing on sheets of a size different from the size of the previously printed sheets.

Many of the conventionally used printing presses are printing presses using plates, i.e., those of the type in which a colorant such as ink is applied to the plates for formation of a print image for printing. In such a conventional printing press, printing on sheets of a size different from that of the previously printed sheets requires the exchange of the plate previously used for printing for another. The printing press must be inevitably stopped during the time for the plate exchange. It is hence possible to spare time for removing the accumulated sheets out of the stocker while the printing press is stopped.

SUMMARY OF THE INVENTION

The present invention is intended for a printing system for continuously printing products of different sheet sizes.

According to the present invention, the printing system comprises: a) a printing apparatus including a-1) a printing section for continuously printing a plurality of print data on a plurality of sheets of paper to provide a plurality of printed sheets, a-2) a stock section including at least one stocker, and a-3) an ejecting mechanism for ejecting the plurality of printed sheets into the stock section; and b) a controller including b-1) an acquiring element for acquiring print sizes corresponding respectively to the plurality of print data, b-2) a comparing element for making a comparison between the print sizes, and b-3) a control element for controlling the printing section and the ejecting mechanism based on a result of the comparison by the comparing element to provide a stable stack including printed sheets of different sheet sizes in the stock section.

Preferably, the print sizes of the print data to be continuously printed are compared with each other. If the print size of print data to be printed later is greater by at least a predetermined value than the print size of printed sheets stored in the stocker, a printing process is suspended, and an operator is prompted to remove the printed sheets out of the stocker; otherwise the destination of the printed sheets for the print data to be printed later is changed to another stocker capable of storing the printed sheets.

This avoids the falling apart of stacks of printed sheets due to the accumulation of a stack of printed sheets of a greater sheet size on a stack of printed sheets of a smaller sheet size.

In accordance with one aspect of the present invention, the controller comprises: a sorting element for sorting the print sizes of the plurality of print data to determine printing order, based on the result of the comparison between the print sizes by the comparing element; and an element for controlling the printing section to print the plurality of print data in the printing order.

This gives precedence to the printing of the sheets having a greater print size to prevent stacks of printed sheets from falling apart.

It is therefore an object of the present invention to avoid the falling apart of a stack of printed sheets of different sizes accumulated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an example of a permissible limit table;

FIGS. 13A through 13D illustrate that the controller of FIG. 11 orders print data in the operation shown in the flowchart of FIG. 12;

DESCRIPTION OF THE PREFERRED EMBODIMENTS

First Preferred Embodiment

Figure 1:
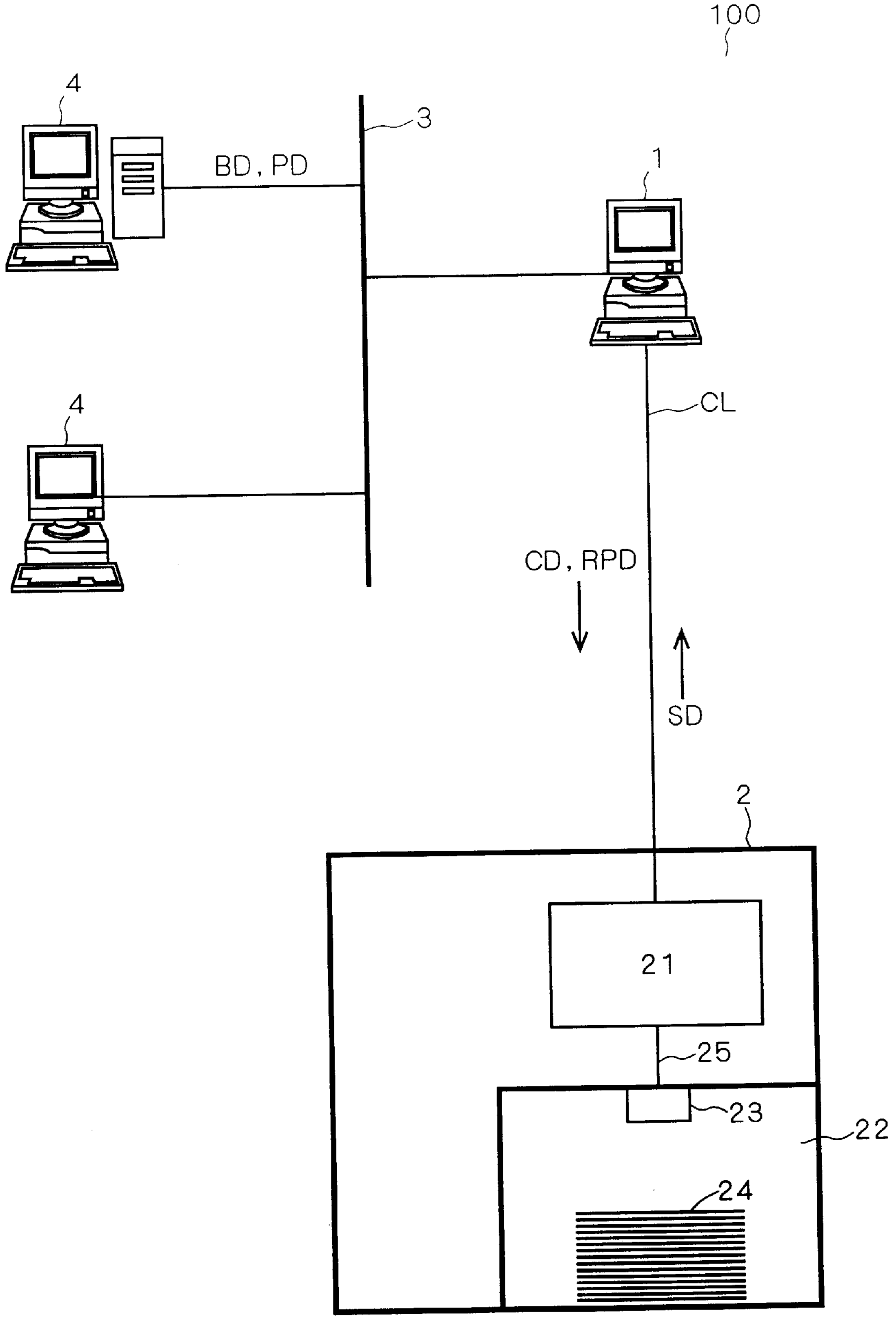
FIG. 1 shows an overview of a printing system.

FIG. 1 shows an overview of a first printing system 100 according to the present invention. The printing system 100 comprises a controller 1, a digital printing press 2, and image processing terminals 4. The controller 1 and the image processing terminals 4 are connected through a network 3. The controller 1 and the digital printing press 2 are connected through a communication line CL.

The image processing terminals 4 produce page data PD for printing a product comprised of a plurality of pages or book data BD comprised of a plurality of page data PD. The controller 1 receives the page data PD or book data BD produced by the image processing terminals 4 through the network 3. The controller 1 rasterizes the received page data PD or book data BD, and transmits resultant print data RPD representing a print image to the digital printing press 2 connected thereto through the communication line CL.

The digital printing press 2 performs printing under the control of the controller 1. The digital printing press 2 comprises a control section 21, a stocker 22, and a detector 23 in addition to a paper feed section, a transport path and a printing section which are not shown. The control section 21 controls the entire digital printing press 2. The print data RPD transmitted from the controller 1 through the communication line CL is received by the control section 21 and is converted into binary half-tone data which in turn is transmitted to the printing section. When a sheet of paper is fed from the paper feed section not shown through the transport path to the printing section, the printing section transfers a print image represented in a half-tone form onto the sheet. A printed sheet 24 is transported through the transport path and stored in the stocker 22. A control signal CD transmitted through the communication line CL is similarly received by the control section 21 and used to control the sections of the digital printing press 2. The control section 21 transmits a status signal SD through the communication line CL to inform the controller 1 about the status of the digital printing press 2.

The stocker 22 is provided to store the sheets 24 of paper printed in the printing section not shown. The stocker 22 has a stocker floor painted black for judgment by the detector 23 to be described later.

The stocker 22 is provided with the detector 23. The detector 23 has a light emitter 231 and a light receiver 232. Light emitted from the light emitter 231 is reflected from the stocker floor of the stocker 22 or from the printed sheets 24. Since the stocker floor is black, there is a difference in illuminance between the light reflected when the printed sheets 24 are accumulated in the stocker 22 and the light reflected when they are not. The detector 23 detects a change in illuminance of the reflected light received by the light receiver 232 to detect the presence/absence of the printed sheets 24 in the stocker 22. The detector 23 transmits information about the presence/absence of the printed sheets 24 through a signal line 25 to the control section 21. For example, the detector 23 transmits "1" to the control section 21 when the printed sheets 24 are accumulated in the stocker 22, and "0" when they are not. The control section 21 adds the information about the presence/absence of the printed sheets 24 to the status signal SD to be transmitted through the communication line CL to inform the controller 1 about the presence/absence of the printed sheets 24 in the stocker 22.

The technique of detecting the printed sheets 24 in the stocker 22 by the detector 23 is not limited to the above-mentioned example. A detector for transmission-type detection, rather than the above-mentioned reflection-type detection, may be provided.

The printed sheets 24 are products resulting from the repeated operations of the control section 21, the paper feed section not shown, the transport path not shown and the printing section not shown to print the print image represented by the print data RPD on a plurality of sheets of paper. The printed sheets 24 include printed sheets 24*a* of "A4" size when the size of the print image represented by the print data RPD is "A4," and printed sheets 24*b* of "A3" size when the size of the print image is "A3." Or the printed sheets 24 include the printed sheets 24*a* of "A4" size when the print size in the setting of the page data PD is "A4," and the printed sheets 24*b* of "A3" size when the print size in the setting of the page data PD is "A3."

For separation of the printed sheets 24 accumulated in the stocker 22, it is desirable that slip paper is inserted between the printed sheets 24*a* and 24*b* or the printed sheets 24*a* and 24*b* are shifted in position when stored.

The signal line 25 is used to transmit the information about whether or not the printed sheets 24 are stored in the stocker 22 from the detector 23 to the control section 21.

Figure 2:
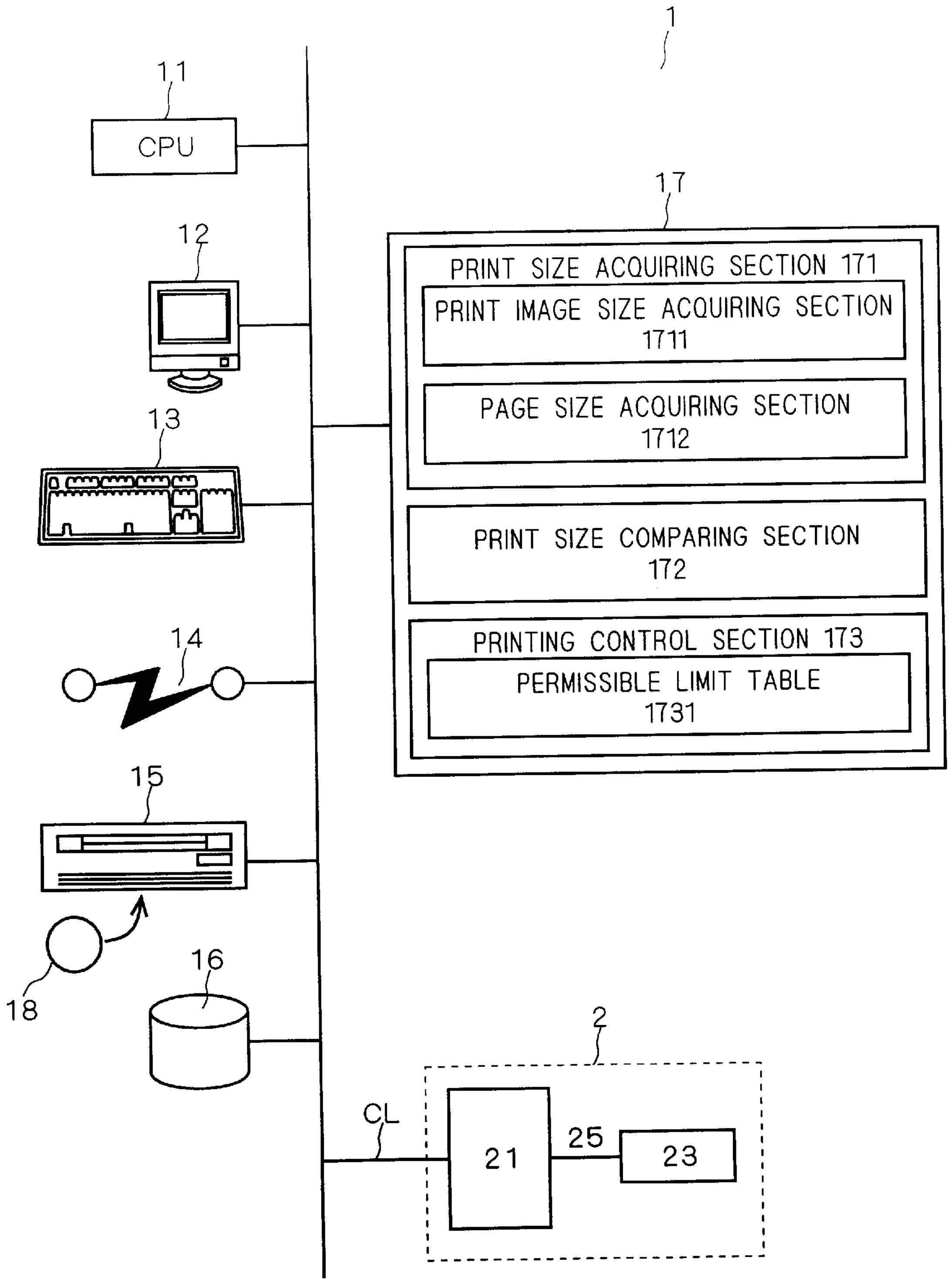
FIG. 2 shows a construction of a controller.

FIG. 2 shows a construction of the controller 1. The controller 1 is a personal computer in typical use, and comprises a CPU 11, a display 12, an input section 13, a network I/F 14, a media drive 15, a storage section 16, a memory 17 and the communication line CL. The CPU 11 controls the entire controller 1, and in particular executes in the memory 17 a program recorded on a media disc 18 inserted in the media drive 15 to implement the functions of the controller 1. The display 12 presents thereon information necessary for the operations of the controller 1. The input section 13 includes a mouse and a keyboard, and is used by an operator entering a command into the controller 1. The network I/F 14 is provided to connect the controller 1 and the network 3 to each other. Through the network I/F 14, the controller 1 receives the page data PD or book data BD from the image processing terminals 4 connected to the network 3. A program for implementing the functions of the controller 1 may be downloaded from a server not shown through the network I/F 14. When the digital printing press 2 is connected through the network 3 to the controller 1, the controller 1 transmits the print data RPD and the control signal CD to the digital printing press 2 through the network I/F 14 and receives the status signal SD from the digital printing press 2 through the network I/F 14. The media drive 15 is used to read the program recorded on the media disc 18. The program read by the media drive 15 implements the functions of the controller 1. When the controller 1 operates offline from the image processing terminals 4, a subsequent process may be performed by recording the page data PD or book data BD produced by the image processing terminals 4 on the media disc 18 and reading the media disc 18 by the media drive 15. The storage section 16 stores therein the program read by the media drive 15. The storage section 16 also stores therein the page data PD, the book data BD and print data RPD. The communication line CL is connected to the digital printing press 2 and is particularly used to transmit the print data RPD and the control signal CD to the control section 21 and to receive the status signal SD transmitted from the digital printing press 2.

The memory 17 is a work area in which the CPU 11 executes the program stored by the storage section 16. In consequence of the execution of the program by the CPU 11, the functions of a print size acquiring section 171, a print size comparing section 172, and a printing control section 173 are implemented in the memory 17.

The print size acquiring section 171 acquires and stores print sizes of at least two print data RPD, respectively. For acquirement of the print sizes, the print size acquiring section 171 comprises a print image size acquiring section 1711 and a page size acquiring section 1712.

The print image size acquiring section 1711 acquires the size of the print image represented by the print data RPD produced by rasterizing the page data PD produced by the image processing terminals 4 in an RIP section (not shown) of the controller 1. The print image size acquiring section 1711 acquires dimensions measured respectively in the X- and Y-directions (referred to hereinafter as x- and y-dimensions) of an area occupied by the print image represented by the print data RPD.

The page size acquiring section 1712 acquires a page size designated by the page data PD or book data BD produced by the image processing terminals 4. When an operator of the image processing terminals 4 designates a sheet size on which the page data PD or book data BD is to be printed, information about the sheet size is contained in the page data PD or book data BD. The page size acquiring section 1712 acquires the sheet size information contained in the page data PD or book data BD thus designated.

The print size acquiring section 171 uses the functions of the print image size acquiring section 1711 and/or the page size acquiring section 1712 to acquire a print size (referred to hereinafter as a first print size SF) of print data printed first (referred to hereinafter as first print data RPDF) and a print size (referred to hereinafter as a second print size SB) of print data to be printed next (referred to hereinafter as second print data RPDB), and stores the first and second print sizes SF and SB.

The print size comparing section 172 makes a comparison between the first print size SF and the second print size SB both acquired by the print size acquiring section 171. The printing control section 173 determines whether to continuously operate the digital printing press 2 or not, based on a result of comparison between the print sizes SF and SB.

The printing control section 173 determines whether to do printing of the second print data RPDB continuously after the printing of the first print data RPDF or not, thereby to determine whether to continuously operate the digital printing press 2 or not. Additionally, the printing control section 173 prompts an operator of the controller 1 to determine whether to continuously operate the digital printing press 2 or not.

For determining whether to continuously operate the digital printing press 2 or not, the printing control section 173 first references the presence/absence of the accumulation of the printed sheets 24 in the stocker 22 which is detected by the detector 23 of the digital printing press 2. If the printed sheets 24 are not accumulated in the stocker 22, there is no possibility that a stack of the printed sheets 24 falls apart. Then, the controller 1 need not effect particular control of the continuous operation of the digital printing press 2. Only when informed about the presence of the accumulation of the printed sheets 24 in the stocker 22 from the detector 23, the controller 1 operates the print size acquiring section 171, the print size comparing section 172 and the printing control section 173 to control the continuous operation of the digital printing press 2.

The printing control section 173 comprises a permissible limit table 1731. The permissible limit table 1731 contains a plurality of permissible limits of differences resulting from the comparison between the first print size SF and the second print size SB.

Although depending on the type and strength of the sheets and the number of printed sheets 24, the falling apart of a stack of the printed sheets 24 of different sheet sizes in the stocker 22 does not occur (i.e., a stable stack of the printed sheets 24 are provided) when the difference, if any, obtained by the comparison between the first print size SF and the second print size SB in the print size comparing section 172 is not significant. This allows the digital printing press 2 to do printing of the second print data RPDB continuously after the first print data RPDF. For this reason, the printing control section 173 references one of the permissible limits contained in the permissible limit table 1731, and determines to print the second print data RPDB continuously after the first print data RPDF if the difference between the first print size SF and the second print size SB obtained as a result of comparison by the print size comparing section 172 falls within the referenced permissible limit. FIG. 3 shows an example of the construction of the permissible limit table 1731.

The permissible limit table 1731 may contain any numerical value entered by the operator of the controller 1.

In this manner, to determine whether to continuously operate the digital printing press 2 or not, the controller 1 has the functions of:

1) acquiring the first print size SF of the first print data RPDF to be printed first, and the second print size SB of the second print data RPDB to be printed next;
2) making a comparison between the first print size SF and the second print size SB;
3) determining to print the second print data RPDB continuously after the first print data RPDF if the result of comparison falls within the permissible limit; and
4) printing the second print data RPDB without waiting for the determinations 1) to 3) if the printed sheets 24 are not stored in the stocker 22 of the digital printing press 2.

Figure 4:
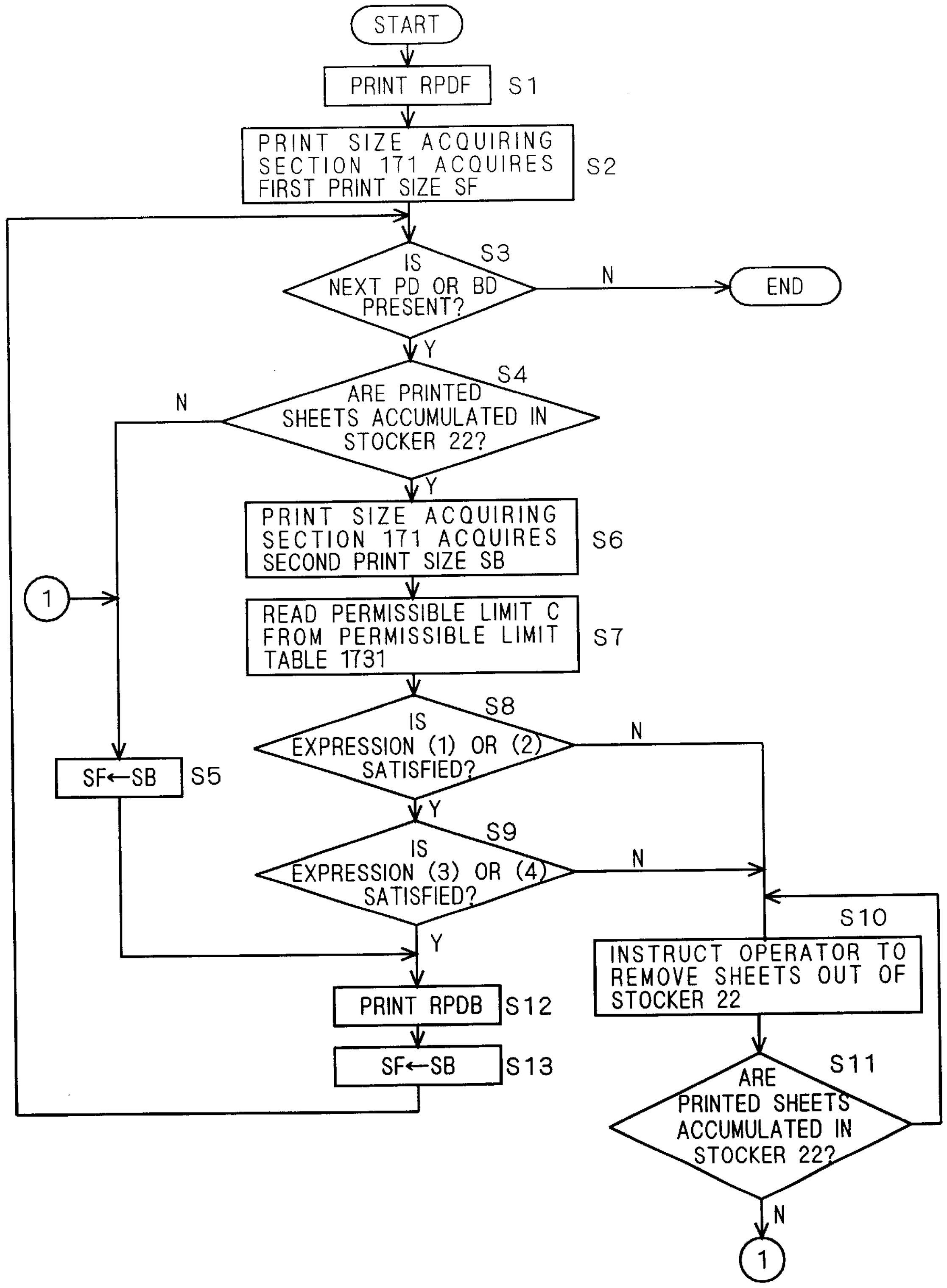
FIG. 4 is a flowchart for illustrating an operation of the printing system of FIG. 1 and, more particularly, operations of the controller and a printing press.

FIG. 4 is a flowchart for illustrating the operation of the printing system 100 and, more particularly, the operations of the controller 1 and the digital printing press 2.

In Step S1, the controller 1 receives and rasterizes the page data PD or book data BD produced by the image processing terminals 4 to produce the print data RPD, and the digital printing press 2 performs printing. The print data RPD for use in printing in Step S1 is used for the first printing in the printing system 100 and thus is defined as the first print data RPDF.

In Step S2, the print size acquiring section 171 causes the print image size acquiring section 1711 or the page size acquiring section 1712 to function to acquire the first print size SF from the first print data RPDF. It is assumed in this case that the print size acquiring section 171 causes the print image size acquiring section 1711 to acquire the x- and y-dimensions of the area occupied by the print image represented by the first print data RPDF as the first print size SF to store the first print size SF.

When the print size acquiring section 171 causes the page size acquiring section 1712 to function to acquire the first print size SF, the page size acquiring section 1712 analyzes the page data PD or book data BD before the rasterization into the first print data RPDF to retrieve a description about a page size contained therein. The print size acquiring section 171 may cause the page size acquiring section 1712 to acquire and store the description about the retrieved page size as the first print size SF.

In Step S3, a judgment is made as to whether or not the controller 1 has received new page data PD or book data BD from the image processing terminals 4. If the controller 1 has not received the new data, the processing is terminated.

If new page data PD or book data BD is received, the controller 1 rasterizes the received page data PD or book data BD to produce the print data RPD. The print data RPD for use in printing in the processes of Step S3 and its subsequent steps is to be printed after the first print data RPDF printed first in Step S1 and thus is defined as the second print data RPDB.

Next, in Step S4, the controller 1 verifies whether or not the printed sheets 24 are accumulated in the stocker 22 of the digital printing press 2. To verify the status of the stocker 22, the printing control section 173 of the controller 1 transmits the control signal CD through the communication line CL to the control section 21 of the digital printing press 2. The control section 21 of the digital printing press 2 receives a signal through the signal line 25 from the detector 23 in response to the control signal CD. The control section 21 judges that the printed sheets 24 are accumulated in the stocker 22 if the signal from the detector 23 is "1" and that the printed sheets 24 are not accumulated in the stocker 22 if the signal from the detector 23 is "0." The control section 21 adds this information to the status signal SD to transmit the status of the stocker 22 to the controller 1.

If the printed sheets 24 are not accumulated in the stocker 22, the process proceeds to Step S5. In Step S5, the print size acquiring section 171 resets the first print size SF acquired in Step S2 to "0." Since the printed sheets 24 are not accumulated in the stocker 22, printing using the second print data RPDB produced in Step S3 becomes the substantially first printing. After the completion of the process in Step S5, the process proceeds to Step S12 to perform printing of the second print data RPDB.

If the printed sheets 24 are accumulated in the stocker 22, the process proceeds to Step S6 and its subsequent steps. In Step S6, the print size acquiring section 171 causes the print image size acquiring section 1711 or the page size acquiring section 1712 to function to acquire the second print size SB from the second print data RPDB. As in Step S1, it is assumed that the print size acquiring section 171 causes the print image size acquiring section 1711 to acquire the x- and y-dimensions of the area occupied by the print image represented by the second print data RPDB as the second print size SB to store the second print size SB.

When the print size acquiring section 171 causes the page size acquiring section 1712 to function to acquire the second print size SB, the page size acquiring section 1712 analyzes the page data PD or book data BD before the rasterization into the second print data RPDB to retrieve a description about a page size contained therein. The print size acquiring section 171 may cause the page size acquiring section 1712 to acquire and store the description about the retrieved page size as the second print size SB.

In Step S7, the printing control section 173 reads a permissible limit C from the permissible limit table 1731. The operator of the controller 1 selects the permissible limit C to be referenced for comparison between the first print size SF and the second print size SB among the plurality of permissible limits contained in the permissible limit table 1731 in consideration for such as the type and strength of the sheets used in the digital printing press 2. The permissible limit C includes a permissible x-dimension limit Cx and a permissible y-dimension limit Cy.

Steps S8 and S9 are the process steps of making a comparison between the first print size SF and the second print size SB. In Step S8, a comparison is made between the x-dimension SFx of the first print size SF and the x-dimension SBx of the second print size SB. This comparison is made using Expressions (1) and (2).

$$SFx-(SBx+Cx)\geqq 1 \quad (1)$$

Expression (1) is to compare the first print size SF with the sum of the second print size SB and the permissible x-dimension limit Cx. If Expression (1) holds, the x-dimension of the first print size SF is sufficiently greater than the x-dimension of the second print size SB, and the process then proceeds to a judgment in Step S9.

$$|SFx-SBx|\leqq Cx \quad (2)$$

Expression (2) is to judge whether the difference between the x-dimensions of the first and second print sizes SF and SB falls within the permissible x-dimension limit Cx. If Expression (2) holds even when the second print size SB is greater than the first print size SF, it is judged that there is no possibility that the stack falling apart, and the process proceeds to the judgment in Step S9. If Expression (2) does not hold, it is judged that there is a possibility that the stack falls apart, and the process proceeds to Step S10.

If the x-dimension of the first print size SF and the x-dimension of the second print size SB satisfy Expressions (1) and (2), the process proceeds to Step S9.

Only one of Expression (1) and (2) may be used for comparison between the x-dimension of the first print size SF and the x-dimension of the second print size SB.

In Step S9, a comparison is made between the y-dimension SFy of the first print size SF and the y-dimension SBy of the second print size SB. This comparison between the first print size SF and the second print size SB is made using Expressions (3) and (4).

$$SFy-(SBy+Cy)\geqq 0 \quad (3)$$

$$|SFy-SBy|\leqq Cy \quad (4)$$

As illustrated, Expressions (3) and (4) differ from Expressions (1) and (2) only in the direction of the dimension to be compared. Thus, if there is no possibility that the stack falls apart as a result of the comparison in Expressions (3) and (4), the process proceeds to Step S12; otherwise the process proceeds to Step S10.

Also, only one of Expression (3) and (4) may be used for comparison between the y-dimension of the first print size SF and the y-dimension of the second print size SB.

In Step S10, the printing control section 173 shows on the display 12 a message such as "Remove accumulated printed sheets out of the stocker of the printing press" to prompt the operator of the controller 1 to remove the accumulated printed sheets 24 out of the stocker 22 of the digital printing press 2.

When this message is displayed, the printing control section 173 verifies the status of the stocker 22 through the control section 21 of the digital printing press 2 (Step S11). As far as the printed sheets 24 remain in the stocker 22, the printing process is not performed on the second print data RPDB, and the process returns to Step S10 since there is a possibility that the stack falls apart. Thus, since the printing process is not performed on the second print data RPDB as far as the printed sheets 24 remain in the stocker 22, the stack falling apart does not occur. The time for the operator of the controller 1 to remove the printed sheets 24 is ensured.

If it is judged in Step S11 that the printed sheets 24 are absent in the stocker 22, the printing control section 173 stops showing the message on the display 12, and the process goes to Step S5. Then, the print size acquiring section 171 sets the stored first print size SF to "0." After the removal of the printed sheets 24 out of the stocker 22, the printed sheets 24 to be produced by the next printing process on the second print data RPDB become the first printed sheets 24 in the stocker 22. This means the absence of the first print size SF.

In Step S12, the controller 1 effects the printing of the second print data RPDB. The CPU 11 of the controller 1 transmits the second print data RPDB through the communication line CL to the digital printing press 2, and the control section 21 of the digital printing press 2 causes the paper feed section, transport path and printing section not shown to function to perform the printing of the second print data RPDB.

After the completion of the printing of the second print data RPDB, the second print size SB is substituted for the first print size SF stored in the print size acquiring section 171 (Step S13). This is because after the accumulation of the printed sheets 24 in the stocker 22 due to the printing process of the second print data RPDB in the process of Step S12, the print size of these printed sheets 24 is handled as the first print size SF for the next printing process. After the completion of the process in Step S13, the process returns to Step S3. Thus, the printing process in the printing system 100 is repeatedly performed.

FIGS. 5A through 5D specifically illustrate the operation of the printing system 100 in the flowchart of FIG. 4. It is assumed that the sizes of the sheets usable in the digital printing press 2 in the printing system 100 of FIG. 1 include "A3w," "A3" and "A4." The "A3w" sheet has x- and y-dimensions slightly greater than those of the "A3" sheet.

Figure 5A:
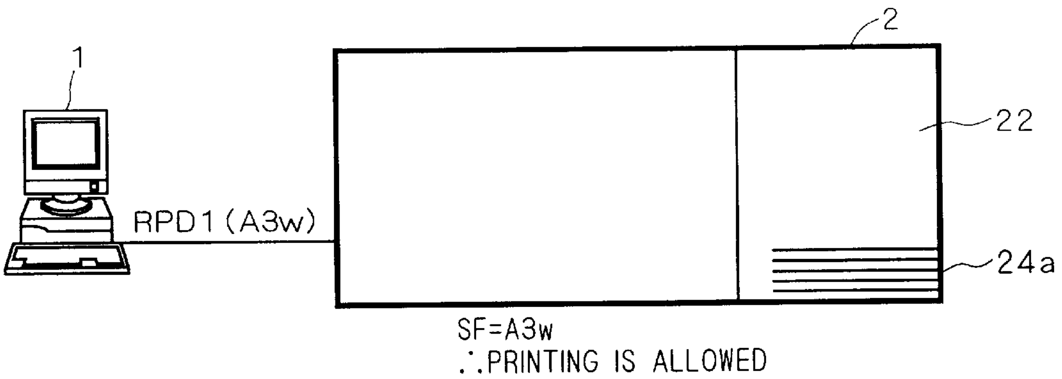
FIGS. 5A through 5D specifically illustrate the operation of the printing system of FIG. 1 in the flowchart of FIG. 4.

FIG. 5A shows a status in the printing system 100 when the first printing is performed based on print data RPD1. It is assumed that the area occupied by a print image represented by the print data RPD1 has the "A3w" size. At the time shown in FIG. 5A, since there are no printed sheets 24 accumulated in the stocker 22 of the digital printing press 2, the printing of the print data RPD1 is the first printing. Thus, the controller 1 performs the printing, whereby printed sheets 24*a* of the "A3w" size are accumulated in the stocker 22. At this time, the first print size SF stored in the print size acquiring section 171 is the same as the "A3w" size, i.e., SFx=318 (mm) and SFy=469 (mm).

Figure 5B:
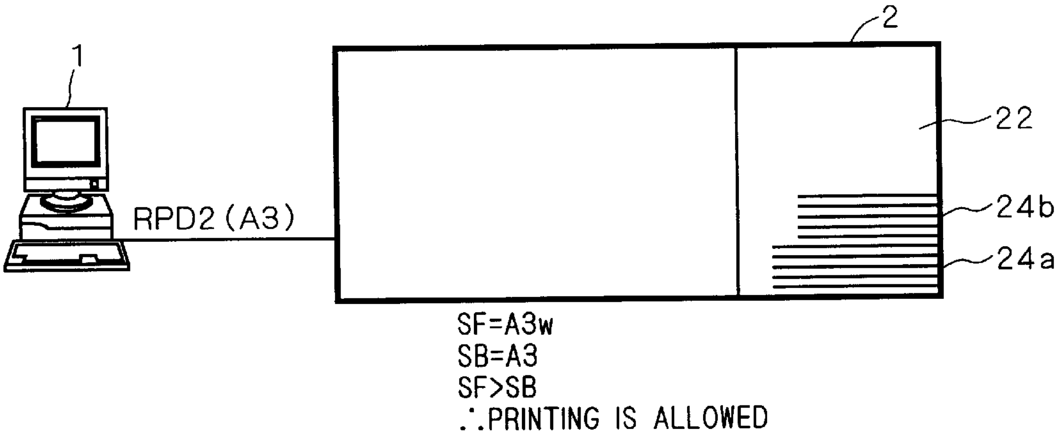

FIG. 5B shows a status in the printing system 100 when printing based on print data RPD2 is performed following the first printing. It is assumed that the area occupied by a print image represented by the print data RPD2 has the "A3" size. At the time shown in FIG. 5B, since the printed sheets 24*a* of the "A3w" size are accumulated in the stocker 22 of the digital printing press 2, the controller 1 defines the print data RPD1 as the first print data RPDF and the print data RPD2 as the second print data RPDB to execute the processes of Step S3 and its subsequent steps shown in the flowchart of FIG. 4. At this time, the second print size SB stored in the print size acquiring section 171 is the same as the "A3" size, i.e., SBx=297 (mm) and SBy=420 (mm). For purposes of simplicity, both of the limits Cx and Cy in the permissible limit C are set at "0." The print size comparing section 172 makes a comparison between the first print size SF and the second print size SB. Since SF>SB in this case, the controller 1 performs printing based on the print data RPD2, whereby printed sheets 24*b* of the "A3" size are accumulated on the printed sheets 24*a* in the stocker 22. Because of the relation SF>SB, the second print size SB is substituted for the first print size SF stored in the print size acquiring section 171. Thus, SFx=297 (mm) and SFy=420 (mm) are substituted for the first print size SF.

Figure 5C:
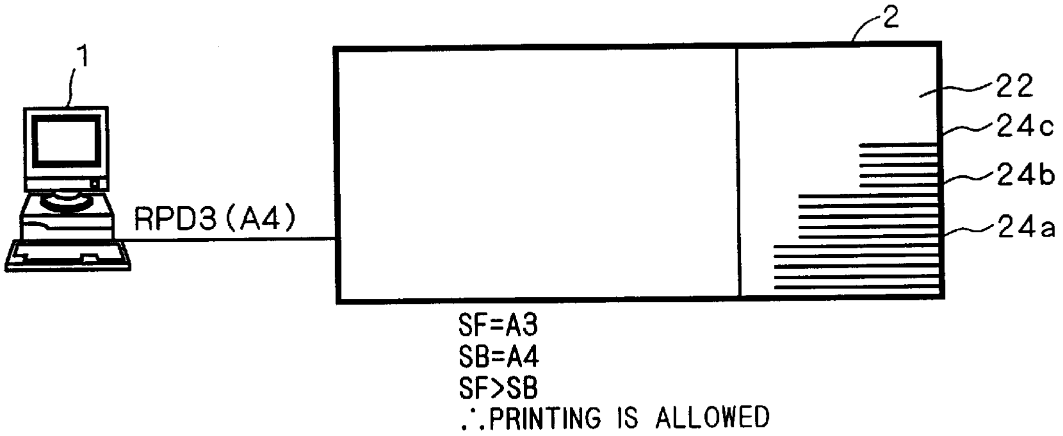

FIG. 5C shows a status in the printing system 100 when printing based on print data RPD3 is subsequently performed. It is assumed that the area occupied by a print image represented by the print data RPD3 has the "A4" size. At the time shown in FIG. 5C, the printed sheets 24*a* of the "A3w" size and the printed sheets 24*b* of the "A3" size are accumulated in the stocker 22 of the digital printing press 2. The controller 1 defines the print data RPD2 as the first print data RPDF and the print data RPD3 as the second print data RPDB to execute the process shown in the flowchart of FIG. 4. Since SF>SB also in this case, the controller 1 performs printing based on the print data RPD3, whereby printed sheets 24*c* of the "A4" size are accumulated on the printed sheets 24*b* in the stocker 22. Because of the relation SF>SB in FIG. 5C, SFx=210 (mm) and SFy=297 (mm) which are the same as those of the area occupied by the print image represented by the print data RPD3 are substituted for the first print size SF.

Figure 5D:
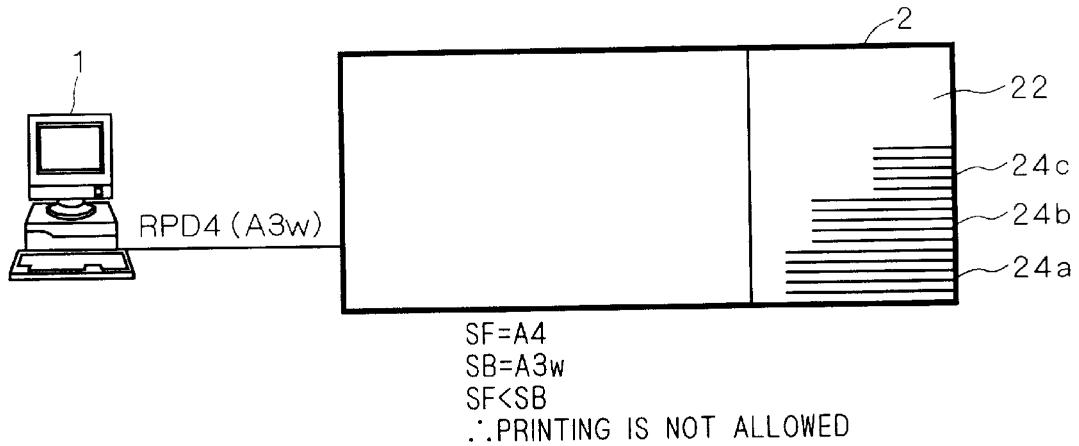

FIG. 5D shows a status in the printing system 100 which is ready for printing based on print data RPD4. It is assumed that the area occupied by a print image represented by the print data RPD4 has the "A3w" size again. At the time shown in FIG. 5D, the printed sheets 24*a*, 24*b* and 24*c* are accumulated in the stocker 22 of the digital printing press 2. The controller 1 defines the print data RPD3 as the first print data RPDF and the print data RPD4 as the second print data RPDB to execute the process shown in the flowchart of FIG. 4. Then, SF<SB since the first print size SF is the "A4" size whereas the second print size SB acquired by the print size acquiring section 171 is the "A3w" size. There is a possibility that the stack of the printed sheets 24*a*, 24*b* and 24*c* (referred to collectively as the printed sheets 24) falls apart if the printing based on the print data RPD4 is performed with the printed sheets 24*a*, 24*b* and 24*c* accumulated in the stocker 22. The printing control section 173 prompts the operator to remove the accumulated printed sheets out of the stocker 22 on the display 12, and stops printing based on the print data RPD4 until the detector 23 of the stocker 22 detects the removal of the printed sheets 24 out of the stocker 22.

As described above, in the printing system 100 shown in FIG. 1, the controller 1 and the digital printing press 2 of FIG. 2 operate as illustrated in the flowchart of FIG. 4 to provide a printing apparatus and a printing method capable of continuous printing to prevent the reduction in printing efficiency when the possibility of the stack falling apart is small although difference sheet sizes are used.

Second Preferred Embodiment

Figure 6:
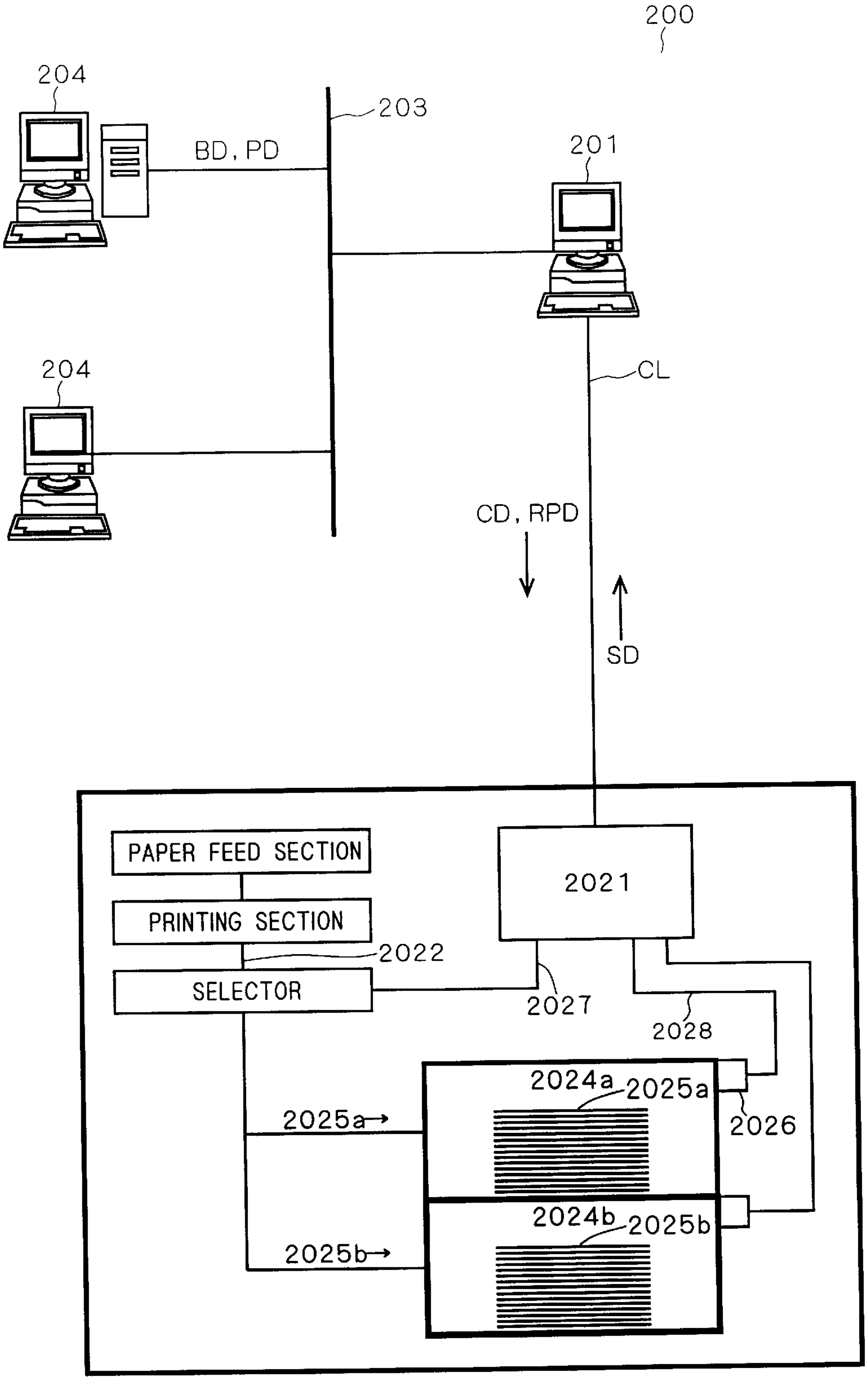
FIG. 6 shows an overview of another printing system.

FIG. 6 shows an overview of a second printing system 200 according to the present invention. The printing system 200 comprises a controller 201, a digital printing press 202, and image processing terminals 204. The controller 201 and the image processing terminals 204 are connected through a network 203. The controller 201 and the digital printing press 202 are connected through the communication line CL.

The image processing terminals 204 are similar in function to the image processing terminals 4 described with reference to FIG. 1, and will not be described herein. The controller 201 rasterizes the page data PD or book data BD transmitted from the image processing terminals 204. The controller 201 transmits the resultant print data RPD representing a print image to the digital printing press 202 connected thereto through the communication line CL. Additionally, the controller 201 controls the operation of a selector 2023 so that printed sheets 2025 are stored in one of a plurality of stockers 2024, which will be described later.

The digital printing press 202 performs printing under the control of the controller 201. The digital printing press 202 comprises a control section 2021, a paper feed section, a printing section, the selector 2023 and the plurality of stockers 2024. The control section 2021 controls the entire digital printing press 202. The print data RPD transmitted from the controller 201 through the communication line CL is received by the control section 2021 and is converted into binary half-tone data which in turn is transmitted to the printing section. A sheet is fed from the paper feed section through a transport path 2022 to the printing section which in turn transfers a print image represented in a half-tone form onto the sheet. A printed sheet 2025 with the print image transferred thereon by the printing section is transported from the printing section through the transport path 2022 and is stored in one of the stockers 2024 selected by the selector 2023. The control signal CD transmitted through the communication line CL is similarly received by the control section 2021 and used to control the sections of the digital printing press 202. The control section 2021 transmits the status signal SD through the communication line CL to inform the controller 201 about the status of the digital printing press 202.

The selector 2023 selects the stocker 2024 for storing the printed sheet 2025 printed by the printing section under the control of the control section 2021 having received the control signal CD transmitted from the controller 201. The printed sheet 2025 is transported from the printing section through the transport path 2022 and is stored in one of the stockers 2024 selected by the selector 2023.

The digital printing press 202 comprises the plurality of stockers 2024 each for storing the printed sheets 2025 therein. The stockers 2024 have unique identification codes, respectively, for distinction therebetween. For example, the number of stockers 2024 is two, identification codes "a" and "b" are assigned to the two stockers 2024, respectively. The stockers 2024 are used in the order of identification codes, unless otherwise specified. Each of the stockers 2024, similar to the stocker 22 illustrated in FIG. 1, is provided with a detector 2026 which transmits information about the presence/absence of the accumulation of the printed sheets 2025 in an associated one of the stockers 2024 through a signal line 2028 to the control section 2021.

The printed sheets 2025 are products resulting from the repeated operations of the control section 2021, the paper feed section and the printing section to print the print image represented by the print data RPD on a plurality of sheets of paper. The printed sheets 2025 include printed sheets 2025*a* of "A4" size when the size of the print image represented by the print data RPD is "A4," and printed sheets 2025*b* of "A3" size when the size of the print image is "A3." Or the printed sheets 2025 include the printed sheets 2025*a* of "A4" size when the print size in the setting of the page data PD is "A4," and the printed sheets 2025*b* of "A3" size when the print size in the setting of the page data PD is "A3."

For separation of the printed sheets 2025, it is desirable that slip paper is inserted between the printed sheets 2025*a* and 2025*b* or the printed sheets 2025*a* and 2025*b* are shifted in position when stored.

A signal line 2027 is used by the control section 2021 controlling the selector 2023. The control section 2021 transmits a control signal through the signal line 2027 to the selector 2023 to cause the selector 2023 to make a selection between the stockers 2024.

Figure 7:
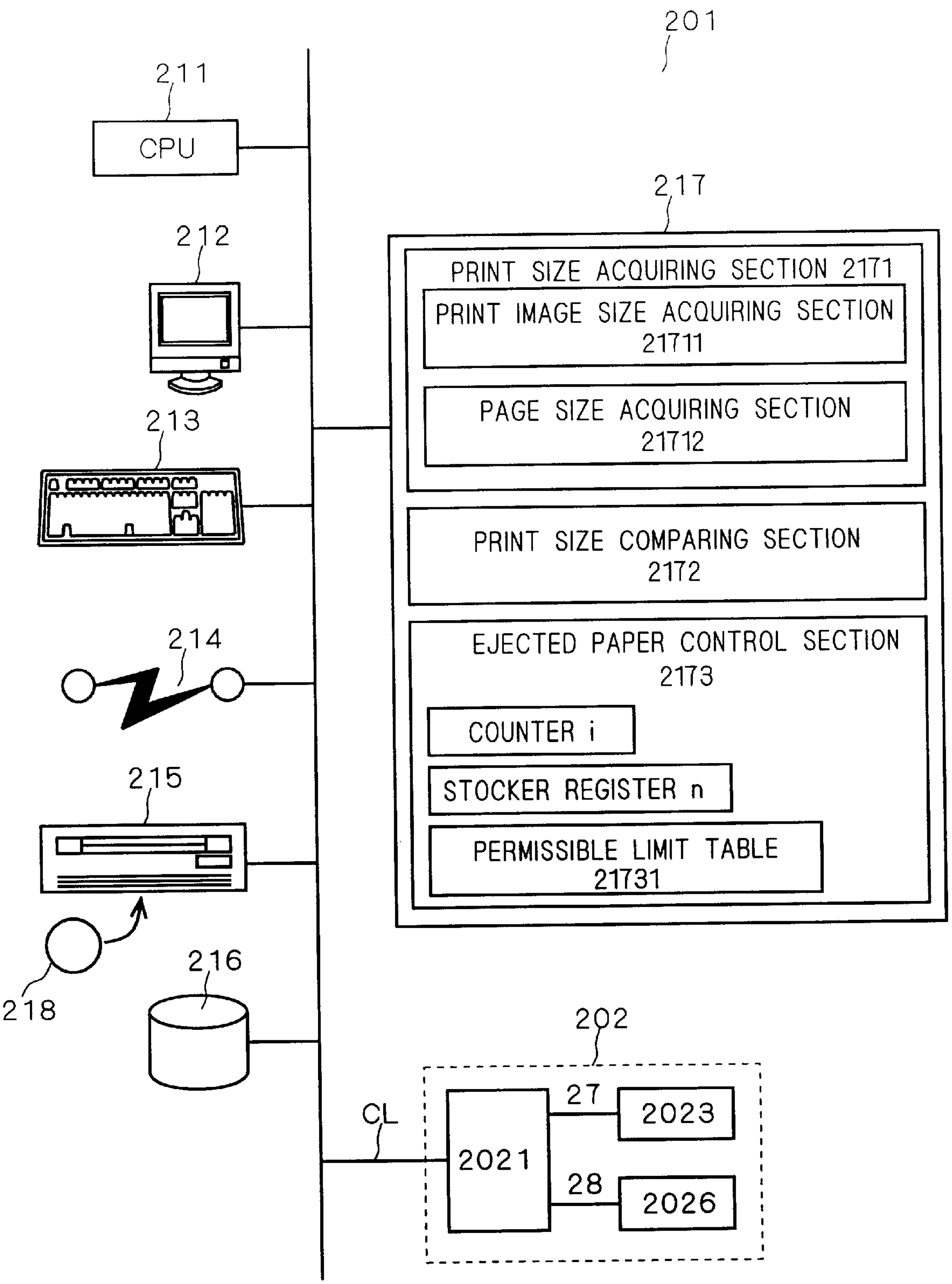
FIG. 7 shows a construction of another controller.

FIG. 7 shows a construction of the controller 201. The controller 201 is a personal computer in typical use, and comprises a CPU 211, a display 212, an input section 213, a network I/F 214, a media drive 215, a storage section 216, a memory 217 and the communication line CL. The controller 201 is similar in construction to the controller 1 illustrated in FIG. 2 except the memory 217 and will not be described herein.

The memory 217 is a work area in which the CPU 211 executes a program stored by the storage section 216. In consequence of the execution of the program by the CPU 211, the functions of a print size acquiring section 2171, a print size comparing section 2172, and an ejected paper control section 2173 are implemented in the memory 217.

The print size acquiring section 2171 acquires and stores the first print size SF and the second print size SB for each of the stockers 2024. For acquirement of the print sizes, the print size acquiring section 2171 comprises a print image size acquiring section 21711 and a page size acquiring section 21712.

The print image size acquiring section 21711 acquires the size of the print image represented by the print data RPD produced by rasterizing the page data PD produced by the image processing terminals 204 in an RIP section (not shown) of the controller 201. The print image size acquiring section 21711 acquires the x- and y-dimensions of an area occupied by the print image represented by the print data RPD.

The page size acquiring section 21712 acquires a page size designated by the page data PD or book data BD produced by the image processing terminals 204. When an operator of the image processing terminals 204 designates a sheet size on which the page data PD or book data BD is to be printed, information about the sheet size is contained in the page data PD or book data BD. The page size acquiring section 21712 acquires the sheet size information contained in the page data PD or book data BD thus designated.

The print size acquiring section 2171 uses the functions of the print image size acquiring section 21711 and/or the page size acquiring section 21712 to acquire the first print size SF of the first print data RPDF and the second print size SB of the second print data RPDB for each of the stockers 2024, and stores the print sizes SF and SB.

The ejected paper control section 2173 controls the selector 2023 through the control section 2021 of the digital printing press 202 to make a selection between the stockers 2024 for storing the printed sheets 2025. This selection is made based on a result of comparison made by the print size comparing section 2172 between the first print size SF of the first print data RPDF and the second print size SB of the second print data RPDB which are acquired by and stored in the print size acquiring section 2171. To this end, the ejected paper control section 2173 comprises a counter i and a stocker register n.

The counter i stores the number of selections of the stockers 2024. Each time the ejected paper control section 2173 makes a new selection between the stockers 2024, the counter i is incremented by one.

The stocker register n stores the value of the select number of the stocker 2024 in which the printed sheets 2025 are to be stored. Specifically, when the stocker register n stores the value "1," the ejected paper control section 2173 sets the value of the select number of the stocker at "1" and determines a stocker 2024*a* having the first one of the identification codes of the stockers 2024 as the stocker in which the printed sheets 2025 are to be stored. When the stocker register n stores the value "2," the ejected paper control section 2173 sets the value of the select number of the stocker at "2" and determines a stocker 2024*b* having the second one of the identification codes of the stockers 2024 as a stocker in which the printed sheets 2025 are to be stored (referred to hereinafter as a destination stocker of the printed sheets).

The ejected paper control section 2173 stores a stocker count m. The stocker count m is the number of stockers 2024 provided in the digital printing press 202.

The ejected paper control section 2173 prompts an operator of the controller 201 to determine whether to continuously operate the digital printing press 202 or not.

The ejected paper control section 2173 further comprises a permissible limit table 21731. The permissible limit table 21731 contains a plurality of permissible limits of differences resulting from the comparison between the first print size SF and the second print size SB, and is similar to the permissible limit table 1731 illustrated in FIG. 2. For comparison in the print size comparing section 2172, similar to the comparison given by Expressions (1) through (4), the ejected paper control section 2173 references one of the permissible limits contained in the permissible limit table 21731. If the result of the comparison shows that the first print size SF is sufficiently greater than the second print size SB or that the difference between the first print size SF and the second print size SB falls within the referenced permissible limit, the ejected paper control section 2173 controls the selector 2023 of the digital printing press 202 to store the printed sheets 2025 with the first print data RPDF printed thereon and the printed sheets 2025 with the second print data RPDB printed thereon in the same stocker 2024.

The print size comparing section 2172 is similar in function to the print size comparing section 172 illustrated in FIG. 2, and will not be described herein.

In this manner, to determine whether to continuously operate the digital printing press 202 or not, the controller 201 has the functions of:

1) acquiring the first print size SF of the first print data RPDF to be printed first, and the second print size SB of the second print data RPDB to be printed next;
2) making a comparison between the first print size SF and the second print size SB; and
3) storing the printed sheets with the first print data RPDF printed thereon and the printed sheets with the second print data RPDB printed thereon in the same stocker 2024 if the result of comparison falls within a stackable limit.

Figure 8:
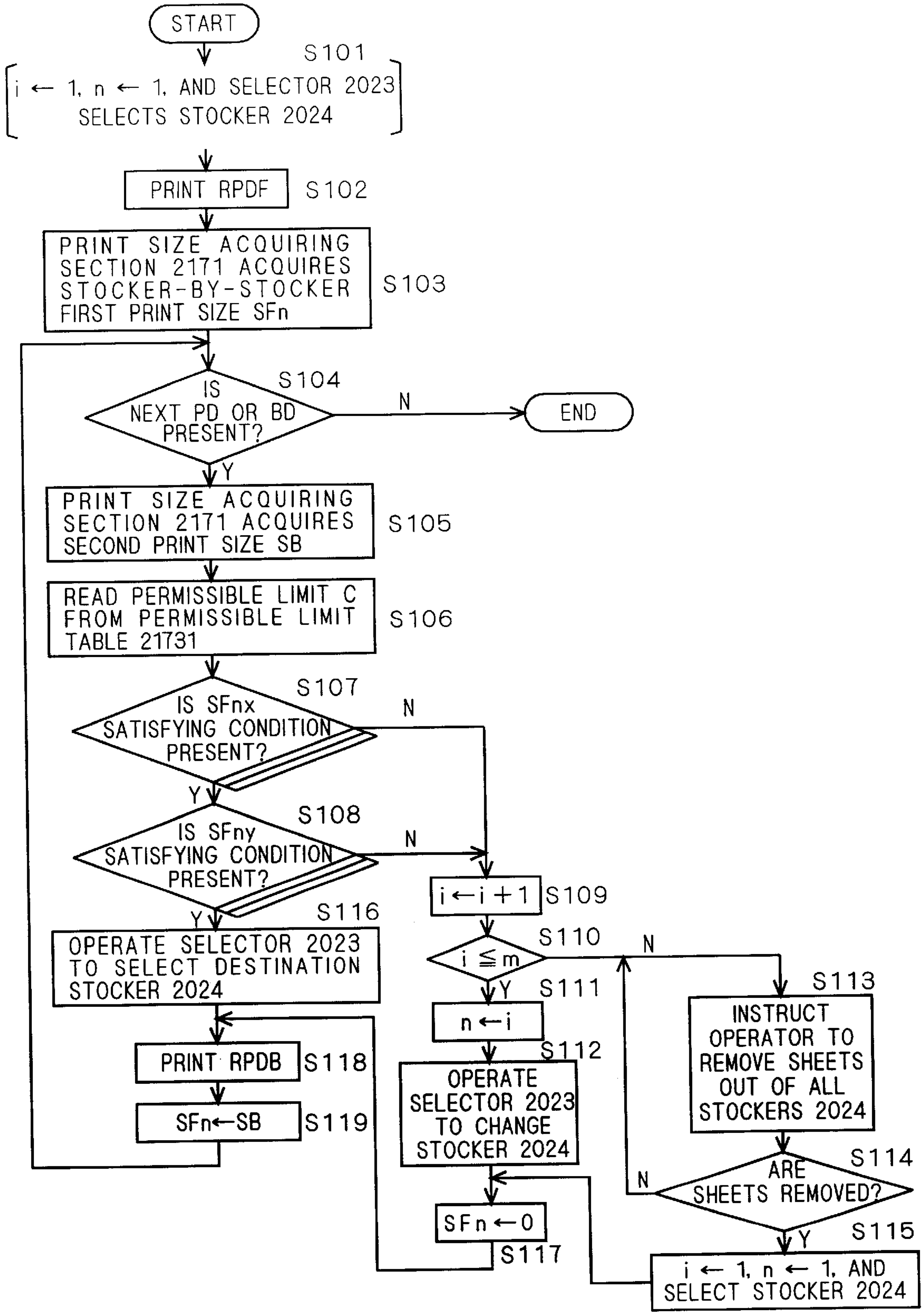
FIG. 8 is a flowchart for illustrating an operation of the printing system of FIG. 6 and, more particularly, operations of the controller of FIG. 7 and another digital printing press.

FIG. 8 is a flowchart for illustrating the operation of the printing system 200 and, more particularly, the operations of the controller 201 and the digital printing press 202.

In Step S101, the counter i and the stocker register n in the ejected paper control section 2173 are set at "1." This means that the printing system 200 always uses one stocker 2024 in which the printed sheets 2025 are to be stored.

In Step S102, the controller 201 receives and rasterizes the page data PD or book data BD produced by the image processing terminals 204 to produce the print data RPD, and the digital printing press 202 performs printing.

The print data RPD for use in printing in Step S102 is used for the first printing in the printing system 200 and thus is defined as the first print data RPDF. Because of the first printing in Step S102, the plurality of stockers 2024 of the digital printing press 202 store no printed sheets 2025 therein. The ejected paper control section 2173 transmits the control signal CD in accordance with the stocker register n to cause the control section 2021 of the digital printing press 202 to operate the selector 2023. This causes the selector 2023 to select one of the stockers 2024 which serves as the destination stocker of the printed sheets 2025 for the first print data RPDF. Since the stocker register n is "1" in the first printing, the stocker 2024*a* having the "first" one of the identification codes is selected as the destination stocker of the printed sheets 2025, for example, when the digital printing press 202 comprises the stockers 2024*a* and 2024*b*.

In Step S103, the print size acquiring section 2171 acquires the print size of the printed sheets stored in the stocker 2024 in the form of a stocker-by-stocker first print size SF1. Stocker-by-stocker first print sizes corresponding to the stocker register n are designated hereinafter by the reference character SFn. The technique in which the print size acquiring section 2171 acquires the stocker-by-stocker first print sizes SFn is similar to the technique indicated in Step S2 of the flowchart shown in FIG. 4.

The stocker-by-stocker first print sizes SFn may be identified by referencing the stocker register n in the ejected paper control section 2173.

Steps S104 through S106 are similar in operation to Steps S3, S6 and S7 of FIG. 4, and will not be described herein.

In Steps S107 and S108, comparisons are made between the stocker-by-stocker first print sizes SFn and the second print size SB by the calculations using Expressions (1) and (2) and Expressions (3) and (4) in the processes of Steps S8 and S9 of FIG. 4. In the subsequent step, the stocker 2024 serving as the destination stocker of the printed sheets 2025 for the second print data RPDB is determined.

The process proceeds to Step S116 if the conditions in Steps S107 and S108 are satisfied, i.e., if a difference between the second print size SB and any one of the stocker-by-stocker first print sizes SFn falls within the permissible limit C. In Step S116, the ejected paper control section 2173 changes the stocker resister n to designate the stocker 2024 corresponding to the stocker-by-stocker first print size SFn which satisfies the conditions in Steps S107 and S108 as the destination stocker of the printed sheets 2025 for the second print data RPDB.

For example, if the stocker-by-stocker first print size SFn satisfying the conditions in Steps S107 and S108 is "SF1," the ejected paper control section 2173 changes the stocker register n to "1" in order to determine the stocker 2024 corresponding to the stocker-by-stocker first print size SF1 as the destination stocker of the printed sheets 2025. Likewise, the ejected paper control section 2173 changes the stocker register n to "2" when determining the stocker 2024 corresponding to a stocker-by-stocker first print size SF2 as the destination stocker of the printed sheets 2025. Concurrently with changing the stocker register n, the ejected paper control section 2173 transmits the control signal CD to cause the selector 2023 of the digital printing press 202 to operate, thereby designating the corresponding stocker 2024 as the destination stocker of the printed sheets 2025.

Thereafter, in Step S118, the second print data RPDB is transmitted to the digital printing press 202, whereby printing is performed. At this time, the printed sheets 2025 with the second print data RPDB printed thereon are stored in the stocker 2024 designated by the ejected paper control section 2173 in Step S116.

In Step S119, the second print size SB is substituted for the stocker-by-stocker first print size SFn stored in the print size acquiring section 2171. This is because after the accumulation of the printed sheets 2025 in any one of the stockers 2024 due to the printing process of the second print data RPDB in the process of Step S118, the print size of these printed sheets 2025 is handled as the stocker-by-stocker first print size SFn for the next printing process. After the completion of the process in Step S119, the process returns to Step S104. Thus, the printing process in the printing system 200 is repeatedly performed.

The process proceeds to Step S109 if the relationships between all of the stocker-by-stocker first print sizes SFn and the second print size SB are out of the permissible limit of stacking as a result of the comparisons in Steps S107 and S108.

The processes in and after Step S109 are to change the destination stocker of the printed sheets 2025 to a new stocker different from the stocker in which the printed sheets 2025 have been stored in the above steps. Supposing the printed sheets 2025 for the second print data RPDB which does not satisfy the condition in Step S107 or S108 are stored in any one of the stockers 2024 in which the printed sheets 2025 have already been stored, there is a possibility that the stack of the printed sheets 2025 falls apart. The processes in and after Step S109 are intended to prevent such an accident.

In Step S109, the ejected paper control section 2173 increments the counter i by one. Specifically, the counter i is incremented by one each time the ejected paper control section 2173 makes a new selection between the stockers 2024.

In Step S110, a comparison is made between the numerical value of the counter i and the stocker count m in the digital printing press 202. If $i \leqq m$ as a result of comparison, the process proceeds to Step S111 in which the numerical value of the counter i is written into the stocker register n.

In Step S112, the ejected paper control section 2173 operates the selector 2023 so as to select the stocker 2024 corresponding to the stocker resister n newly written in Step S111.

Specifically, the writing of the numerical value of the counter i in the stocker register n means the addition of one new stocker 2024 to be used in the digital printing press 202. The ejected paper control section 2173 operates the selector 2023 so as to select the added stocker 2024 as the destination stocker of the printed sheets 2025 on which the second print data RPDB is printed. For example, if the counter i is changed to "2" whereby "2" is written in the stocker register n when the digital printing press 202 comprises the stockers 2024*a* and 2024*b*, the ejected paper control section 2173 operates the selector 2023 so as to store the printed sheets 2025 in the stocker 2024*b* having the identification code corresponding to the stocker register n.

After the determination of the stocker 2024 serving as the destination stocker of the printed sheets 2025 for the second print data RPDB by the operation of the selector 2023, the process proceeds to Step S117. In Step S117, the print size acquiring section 2171 acquires the stocker-by-stocker first print size SFn which is "0" for the stocker 2024 newly selected. This is because, for the newly selected stocker 2024, the printed sheets 2025 to be produced by the process of printing the second print data RPDB become the first printed sheets 2025 and the first print size SF does not exist, as in Step S5 of FIG. 4.

Thereafter, in Step S118, the second print data RPDB is transmitted to the digital printing press 202, whereby printing is performed. At this time, the printed sheets 2025 with the second print data RPDB printed thereon are stored in the stocker 2024 designated by the ejected paper control section 2173 in Step S112.

If $i>m$ as a result of comparison between the counter i and the stocker count m in Step S110, the ejected paper control section 2173 performs the processes in Step S113 and its subsequent steps. This relation $i>m$ as a result of comparison between the counter i and the stocker count m means that the number of times a new stocker is selected exceeds the number of stockers in the digital printing press 202. In actuality, however, the selection of a new stocker 2024 is not permitted since the digital printing press 202 has no newly selectable stocker 2024. In Step S113, the ejected paper control section 2173 displays a message directing the operator of the controller 201 to remove the printed sheets 2025 out of all of the stockers 2024 on the display 212, thereby prompting the operator of the controller 201 to intervene. The process of printing the second print data RPDB which does not satisfies the condition in Step S107 or S108 is suspended.

In Step S114, the ejected paper control section 2173 judges whether or not the printed sheets 2025 are removed out of all of the stockers 2024. The detectors 2026 provided for the respective stockers 2024 detect the presence/absence of the printed sheets 2025 stored therein, and transmit the status of the respective stockers 2024 to the control section 2021. As far as the detectors 2026 detect that the printed sheets 2025 remain unremoved in any one of the stockers 2024, the ejected paper control section 2173 maintains its state of Step S113. When the detectors 2026 detect that all of the stockers 2024 store no printed sheets 2025, the control section 2021 issues the status signal SD based on information so indicating to transmit such a status to the ejected paper control section 2173.

After the removal of the printed sheets 2025 out of all of the stockers 2024, the process proceeds to Step S115. In Step S115, the ejected paper control section 2173 sets the counter i and the stocker register n again at "1." The ejected paper control section 2173 further transmits the control signal CD in accordance with the set stocker register n to cause the control section 2021 of the digital printing press 202 to operate the selector 2023. This causes the selection of the destination stocker of the printed sheets 2025 for the second print data RPDB among all of the stockers 2024 in accordance with one of the identification codes assigned to the individual stockers 2024 which corresponds to the stocker register n. For example, if the ejected paper control section 2173 sets the stocker register n at "1" after the removal of the printed sheets 2025 out of all of the stockers 2024 when the digital printing press 202 comprises the stockers 2024*a* and 2024*b*, the stocker 2024*a* is selected as the destination stocker of the printed sheets 2025 in accordance with the order of the identification codes.

After the removal of the printed sheets 2025 out of the stockers 2024, there is no first print size SF. Hence, in Step S117, the print size acquiring section 2171 acquires the stocker-by-stocker first print size SFn which is "0" for the stocker 2024 selected as the destination stocker of the printed sheets 2025. Thereafter, in Step S118, the second print data RPDB is transmitted to the digital printing press 202, whereby printing is performed. At this time, the printed sheets 2025 with the second print data RPDB printed thereon are stored in the stocker 2024 designated by the ejected paper control section 2173 in Step S115.

FIGS. 9A through 9E specifically illustrate the operation of the printing system 200 in the flowchart of FIG. 8. It is assumed that the sizes of the sheets usable in the digital printing press 202 in the printing system 200 of FIG. 8 include "A3w," "A3" and "A4," as described with reference to FIG. 4.

Figure 9A:
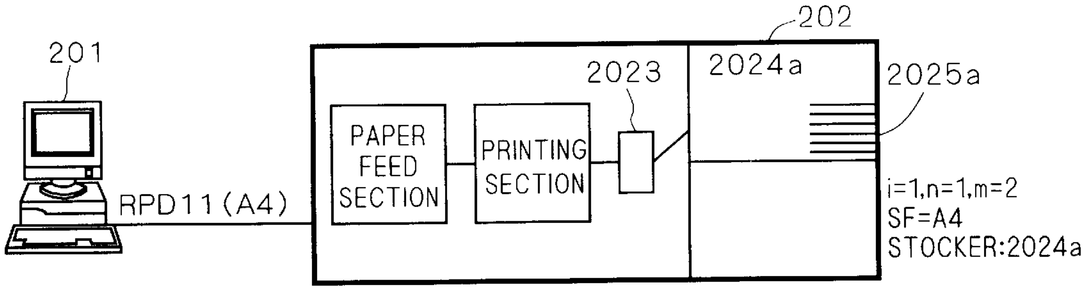
FIGS. 9A through 9E specifically illustrate the operation of the printing system of FIG. 6 in the flowchart of FIG. 8.

FIG. 9A shows a status in the printing system 200 when the first printing is performed based on print data RPD11. It is assumed that the area occupied by a print image represented by the print data RPD11 has the "A4" size. At the time shown in FIG. 9A, since there are no printed sheets 2025 accumulated in the plurality of stockers 2024 of the digital printing press 202, the printing of the print data RPD11 is the first printing. Thus, the ejected paper control section 2173 makes the following settings: the counter i=1, the stocker register n=1, and the stocker count m=2. The controller 201 performs the printing, whereby printed sheets 2025*a* of the "A4" size are stored in the stocker 2024*a*.

Figure 9B:
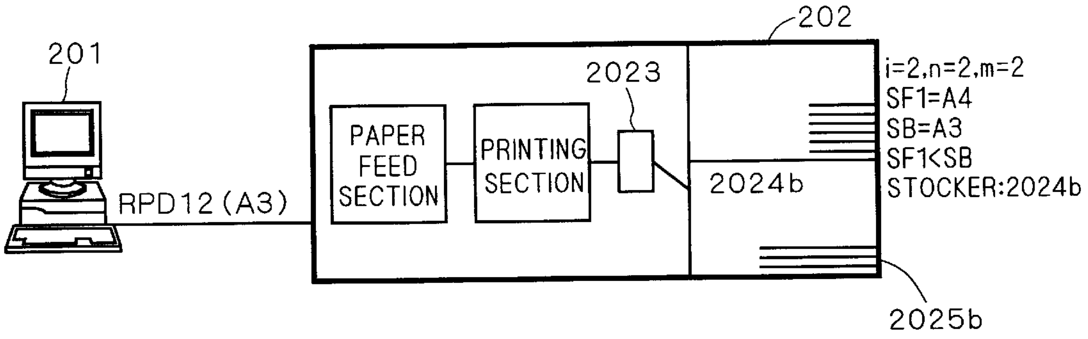

FIG. 9B shows a status in the printing system 200 when printing based on print data RPD12 is performed following the first printing. It is assumed that the area occupied by a print image represented by the print data RPD12 has the "A3" size. At the time shown in FIG. 9B, since the printed sheets 2025*a* of the "A4" size are stored in the stocker 2024*a* of the digital printing press 202, the controller 201 defines the print data RPD11 as the first print data RPDF and the print data RPD12 as the second print data RPDB to execute the processes of Step S104 and its subsequent steps shown in the flowchart of FIG. 8.

At this time, the stocker-by-stocker first print size SFn to be stored in the print size acquiring section 2171 is "SF1" corresponding to the stocker 2024*a* because the stocker register n=1, and the stocker-by-stocker first print size SF1 has the same value as the "A4" size of the area occupied by the print image represented by the print data RPD11. The second print size SB to be stored in the print size acquiring section 2171 has the same value as the "A3" size. Both of the limits Cx and Cy in the permissible limit C are assumed to be 50 (mm).

The print size comparing section 2172 makes a comparison between the stocker-by-stocker first print size SF1 and the second print size SB. Since SF1<SB in this case, the ejected paper control section 2173 judges that the accumulation of the printed sheets 2025 for the second print data RPDB on the printed sheets 2025*a* stored in the stocker 2024*a* is not permitted in printing based on the print data RPD12, and the controller 201 proceeds to Step S109. The ejected paper control section 2173 increments the counter i by one, and compares the incremented counter i with the stocker count m. Since i≦m, the ejected paper control section 2173 changes the stocker register n to "2," and operates the selector 2023 to change the destination stocker of the printed sheets 2025 to be ejected from the printing section to the stocker 2024*b* in accordance with the order of the identification codes of the stockers. Thereafter, the controller 201 performs printing based on the print data RPD12 in the process of Step S117, whereby resultant printed sheets 2025*b* are stored in the stocker 2024*b*. In Step S119, the stocker-by-stocker first print size SFn is changed to "SF2" corresponding to the stocker 2024*b* since the stocker register n=2, and the stocker-by-stocker first print size SF2 having the same value as the "A3" size is stored in the print size acquiring section 2171.

Figure 9C:
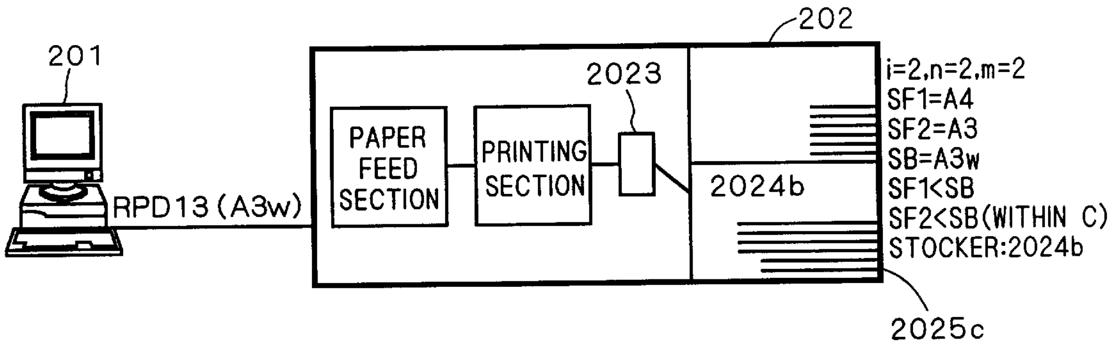

FIG. 9C shows a status in the printing system 200 when printing based on print data RPD13 is subsequently performed. It is assumed that the area occupied by a print image represented by the print data RPD13 has the "A3w" size. At the time shown in FIG. 9C, the printed sheets 2025*a* of the "A4" size and the printed sheets 2025*b* of the "A3" size are stored in the stockers 2024*a* and 2024*b*, respectively, of the digital printing press 202. The controller 201 defines the sizes of the areas occupied by the print images represented by the print data RPD 11 and RPD 12 as the respective stocker-by-stocker first print sizes SFn and the size of the area occupied by the print image represented by the print data RPD13 as the second print size SB to execute the operation shown in the flowchart of FIG. 8.

In this case, SF1<SB and SF2<SB, but both of the differences between the stocker-by-stocker first print size SF2 which is the "A3" size defined as X=297 (mm) and Y=420 (mm) and the second print size SB which is the "A3w" size defined as X=318 (mm) and Y=469 (mm) fall within the permissible limit C. Therefore, the stocker 2024*b* corresponding to the stocker-by-stocker first print size SF2 is determined as the destination stocker of printed sheet 2025*c*. The controller 201 performs printing based on the print data RPD13, whereby the resultant printed sheets 2025*c* are accumulated on the printed sheets 2025*b* in the stocker 2024*b*.

Figure 9D:
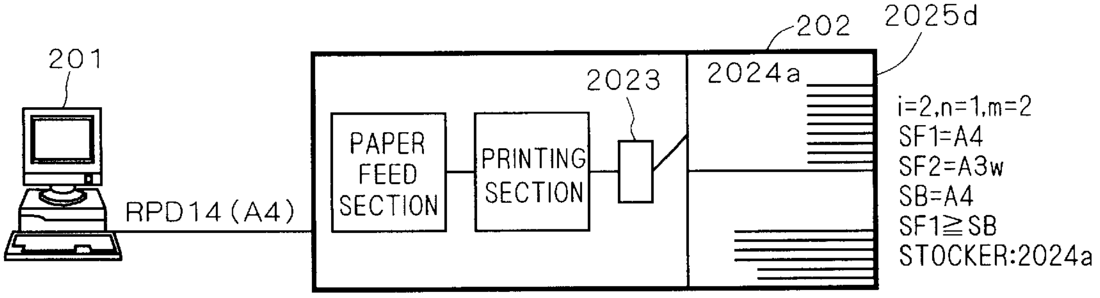

FIG. 9D shows a status in the printing system 200 when printing based on print data RPD14 is subsequently performed. It is assumed that the area occupied by a print image represented by the print data RPD14 has the "A4" size again. The controller 201 defines the sizes of the areas occupied by the print images represented by the print data RPD11 and RPD13 as the respective stocker-by-stocker first print sizes SFn and the size of the area occupied by the print image represented by the print data RPD14 as the second print size SB to execute the operation shown in the flowchart of FIG. 8.

In this case, since SF1≧SB, the ejected paper control section 2173 operates the selector 2023 to determine the stocker 2024*a* corresponding to the stocker-by-stocker first print size SF1 as the destination stocker of printed sheet 2025*d* for the print data RPD14. The controller 201 performs printing based on the print data RPD14, whereby the resultant printed sheets 2025*d* having the "A4" size are accumulated on the printed sheets 2025*a* in the stocker 2024*a*.

Figure 9E:
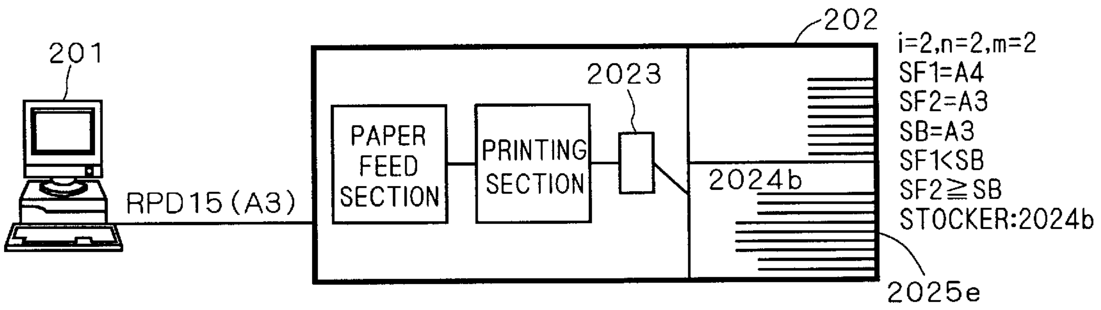

FIG. 9E shows a status in the printing system 200 when printing based on print data RPD15 is subsequently performed. It is assumed that the area occupied by a print image represented by the print data RPD15 has the "A3" size again. The controller 201 defines the sizes of the areas occupied by the print images represented by the print data RPD14 and RPD13 as the respective stocker-by-stocker first print sizes SFn and the size of the area occupied by the print image represented by the print data RPD15 as the second print size SB to execute the operation shown in the flowchart of FIG. 8, as in FIG. 4C and 4D.

In this case, since SF1<SB but SF2≧SB, the ejected paper control section 2173 operates the selector 2023 to determine the stocker 2024*b* corresponding to the stocker-by-stocker first print size SF2 as the destination stocker of printed sheet 2025*e* for the print data RPD15. The controller 201 performs printing based on the print data RPD15.

As described above, in the printing system 200 shown in FIG. 6, the controller 201 and the digital printing press 202 of FIG. 7 operate as illustrated in the flowchart of FIG. 8 to provide a printing apparatus and a printing method capable of changing the destination stocker of the printed sheets when different sheet sizes are used, and capable of continuous printing to prevent the reduction in printing efficiency when the possibility of the stack falling apart is small although difference sheet sizes are used.

The ejected paper control section 2173 may operate the selector 2023 so that when the printed sheets 2025 are removed out of any one of the stockers 2024, rather than all of the stockers 2024, the sheet-removed stocker 2024 is selected as the destination stocker.

Third Preferred Embodiment

Figure 10:
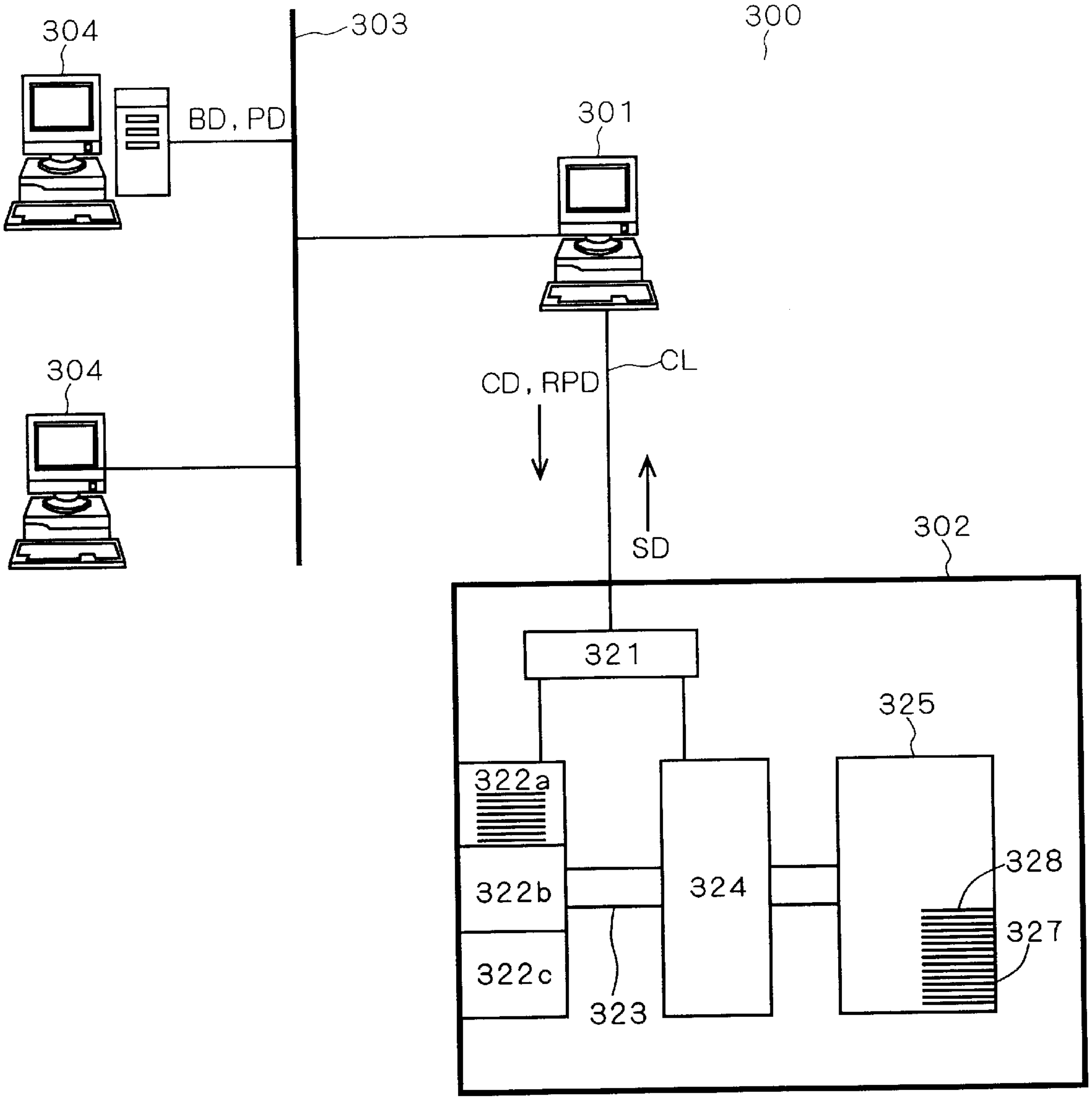
FIG. 10 shows a construction of still another printing system embodying the present invention.

FIG. 10 shows an overview of a third printing system 300 according to the present invention. The printing system 300 comprises a controller 301, a digital printing press 302, and image processing terminals 304. The controller 301 and the image processing terminals 304 are connected through a network 303. The controller 301 and the digital printing press 302 are connected through the communication line CL.

The image processing terminals 304 are similar in function to the image processing terminals 4 described with reference to FIG. 1, and will not be described herein.

The digital printing press 302 performs printing under the control of the controller 301. The digital printing press 302 comprises a control section 321, a paper feed section 322, a transport path 323, a printing section 324, and a stocker 325.

The control section 321 controls the entire digital printing press 302. The control section 321 receives the print data RPD transmitted from the controller 301 through the communication line CL, converts the print data RPD into binary half-tone data RPDD, and transmits the binary half-tone data RPDD to the printing section 324. The control signal CD transmitted through the communication line CL is similarly received by the control section 321 and used to control the sections of the digital printing press 302. The control section 321 transmits the status signal SD through the communication line CL to inform the controller 301 about the status of the digital printing press 302.

The paper feed section 322 stores sheets of paper for use in printing, and feeds the sheets through the transport path 323 to the printing section 324. The paper feed section 322 comprises a plurality of paper feed cassettes storing sheets 326 of paper therein, and a paper feed mechanism not shown for taking the sheets 326, one at a time, out of the each of the plurality of paper feed cassettes. The plurality of paper feed cassettes store the sheets 326 of respectively different sizes and different types. The plurality of paper feed cassettes have unique identification codes, respectively, for distinction therebetween. For example, identification codes "a," "b" and "c" are assigned to the paper feed cassettes, respectively.

The transport path 323 is provided to transport the sheets 326 taken out of the paper feed section 322 to the printing section 324 and the stocker 325.

The printing section 324 prints a print image represented by the print data RPD on the sheets 326 transported thereto through the transport path 323. The printing section 324 is a mechanism, e.g., for electrostatographic printing. When a sheet 326 is fed from the paper feed section 322 storing the sheets 326 of different sizes through the transport path 323 to the printing section 324, the printing section 324 transfers the print image represented in a half-tone form onto the sheet 326, based on the binary half-tone data RPDD produced by the control section 321. A printed sheet 327 with the print image transferred thereon is transported through the transport path 323 to the stocker 325.

The stocker 325 is provided to store the sheets 327 printed in the printing section 324.

A stack 328 is an accumulation of the printed sheets 327 which result from the repeated operations of the control section 321, the paper feed section 322, the transport path 323 and printing section 324 to print the print image represented by the print data RPD on the plurality of sheets 326. The stack 328 includes a stack 328*a* of printed sheets 327*a* of "A4" size when the size of the print image represented by the print data RPD is "A4," and a stack 328*b* of printed sheets 327*b* of "A3" size when the size of the print image is "A3." Or the stack 328 includes the stack 328*a* of the printed sheets 327*a* of "A4" size when the print size in the setting of the page data PD is "A4," and the stack 328*b* of the printed sheets 327*b* of "A3w" size when the print size in the setting of the page data PD is "A3."

For separation of the stacks 328 accumulated in the stocker 325, it is desirable that slip paper is inserted between the stacks 328 or the stacks 328 are shifted in position when stored.

Figure 11:
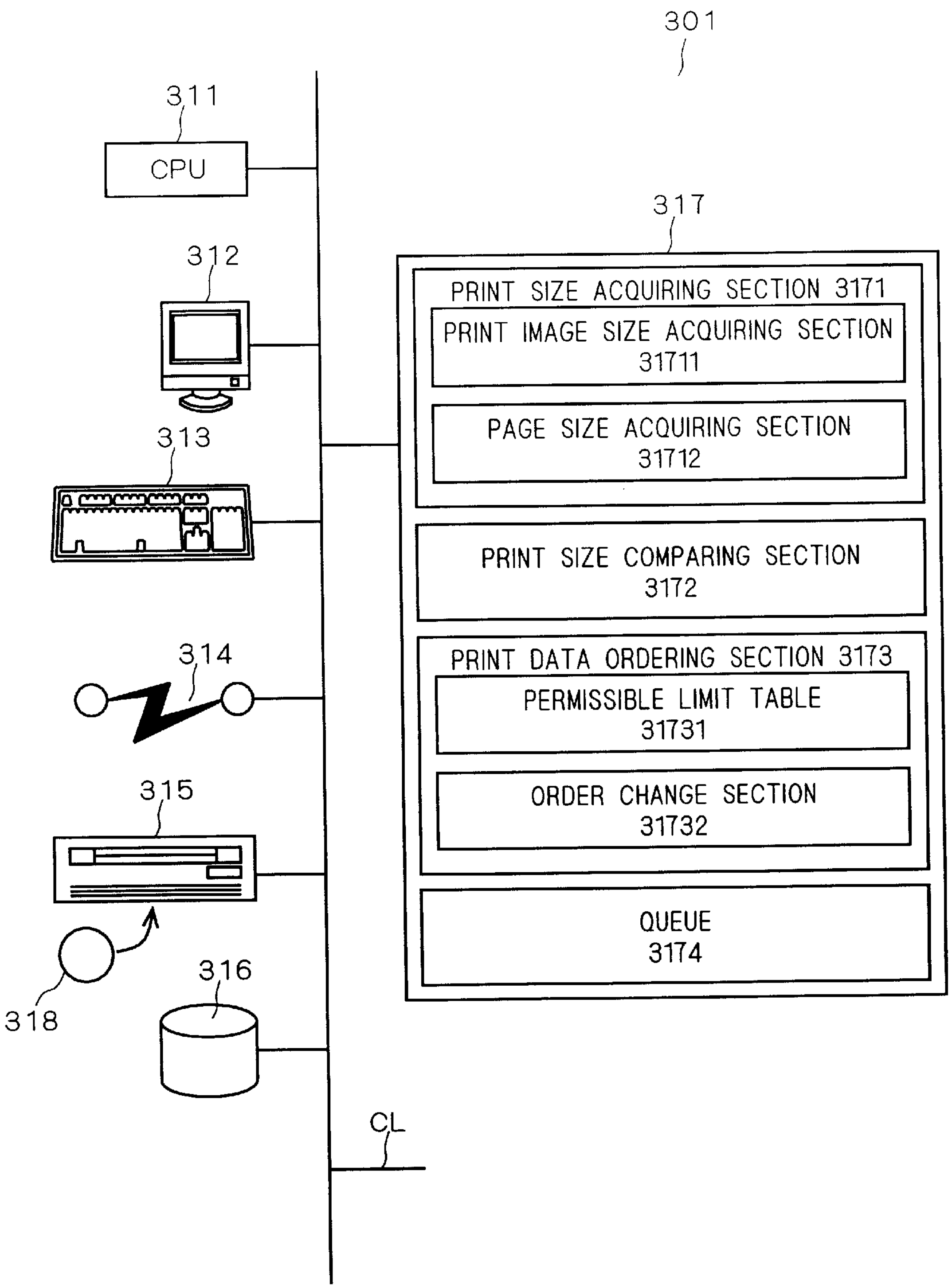
FIG. 11 shows a construction of still another controller.

FIG. 11 shows a construction of the controller 301. The controller 301 is a personal computer in typical use, and comprises a CPU 311, a display 312, an input section 313, a network I/F 314, a media drive 315, a storage section 316, a memory 317 and the communication line CL. The controller 301 is similar in construction to the controller 1 illustrated in FIG. 2 except the memory 317 and will not be described herein.

The memory 317 is a work area in which the CPU 311 executes the program stored by the storage section 316. In consequence of the execution of the program by the CPU 311, the functions of a print size acquiring section 3171, a print size comparing section 3172, a print data ordering section 3173 and a queue 3174 are implemented in the memory 317.

The print size acquiring section 3171 acquires and stores the print size of each of the plurality of print data RPD. For acquirement of the print sizes, the print size acquiring section 3171 comprises a print image size acquiring section 31711 and a page size acquiring section 31712.

The print image size acquiring section 31711 acquires the size of the print image represented by the print data RPD produced by rasterizing the page data PD produced by the image processing terminals 304 in an RIP section (not shown) of the controller 301. The print image size acquiring section 31711 acquires the x- and y-dimensions of an area occupied by the print image represented by the print data RPD.

The page size acquiring section 31712 acquires a page size designated by the page data PD or book data BD produced by the image processing terminals 304. When an operator of the image processing terminals 304 designates a sheet size on which the page data PD or book data BD is to be printed, information about the sheet size is contained in the page data PD or book data BD. The page size acquiring section 31712 acquires the sheet size information contained in the page data PD or book data BD thus designated.

The print size acquiring section 3171 uses the functions of the print image size acquiring section 31711 and/or the page size acquiring section 31712 to acquire the print size SP of each of the print data RPD, and stores the print sizes SP.

The print size comparing section 3172 makes a comparison between the print sizes SP acquired by the print size acquiring section 3171. Based on a result of comparison, the print data ordering section 3173 orders the plurality of print data RPD.

The print data RPD stored in the storage section 316 of the controller 301 are in many cases arranged in a given order without considerations for the prevention of the stack falling apart, for example, in the order in which the print data RPD are produced, in order of names of the print data RPD or in order of amounts of the print data RPD. For the purpose of preventing the stack from falling apart, the print data ordering section 3173 sorts the print data RPD in such an order that the stacks 328 of the printed sheets 327 are to be accumulated in descending order of print sizes in the stocker 325, to produce print data ordering information RPL. The plurality of print data RPD are outputted to the digital printing press 302 in the order defined by the print data ordering information RPL produced by the print data ordering section 3173.

The print data ordering section 3173 comprises a permissible limit table 31731 and an order change section 31732.

The permissible limit table 31731 contains a plurality of permissible limits of differences resulting from the comparison between the print sizes of the respective print data. Although depending on the type and strength of the sheets 326 and the number of printed sheets 327, the falling apart of the stacks 328 of different sheet sizes in the stocker 325 does not occur when the difference, if any, obtained by the comparison between the print sizes SP in the print size comparing section 3172 is not significant. Hence, by referencing one of the permissible limits contained in the permissible limit table 31731, the print data ordering section 3173 can produce the print data ordering information RPL which permits printing of the print data RPD having a smaller print size SP prior to printing of the print data RPD having a greater print size only when the result of comparison in the print size comparing section 3172 falls within the referenced permissible limit. The permissible limit table 31731 may contain any numerical value entered by the operator of the controller 301. The permissible limit table 31731 used herein may be similar to that shown in FIG. 3.

The order change section 31732 accepts a change made by the operator of the controller 301 to the order of the print data RPD determined by the print data ordering section 3173. As mentioned above, depending on the type and strength of the sheets 326 and the number of printed sheets 327, the falling apart of the stacks 328 of different sheet sizes in the stocker 325 does not occur. In such a case, the operator can arrange the print data RPD in a desired order, rather than in the order of the print sizes. In accordance with an operator's input to the input section 313, the order change section 31732 accepts the change in the order of the print data RPD determined by the print data ordering section 3173. The print data ordering section 3173 produces the print data ordering information RPL in response to the change in the order accepted by the order change section 31732.

The queue 3174 outputs in a predetermined order the print data RPD stored in the storage section 316 to the digital printing press 302. The queue 3174 produces ordering information IL containing the order in which the print data RPD are stored in the storage section 316 and print data names so that the print data RPD are outputted in the order in which the print data RPD are stored in the storage section 316, unless otherwise specified. When the print data ordering section 3173 produces the print data ordering information RPL, the queue 3174 stores the print data ordering information RPL, and outputs the print data RPD stored in the storage section 316 to the digital printing press 302, in the order defined by the print data ordering information RPL.

Alternatively, the queue 3174 may store therein the print data RPD themselves in the order defined by the print data ordering information RPL and output the print data RPD to the digital printing press 302.

In this manner, to continuously performing printing which prevents the stack falling apart in the digital printing press 302, the controller 301 has the functions of:

1) acquiring the print sizes SP of the respective print data RPD;
2) making a comparison between the print sizes SP of the respective print data RPD;
3) ordering the print data RPD in accordance with the print sizes SP to output the print data RPD in this order to the digital printing press; and
4) changing the order of the print data RPD in response to the operator's desire.

Figure 12:
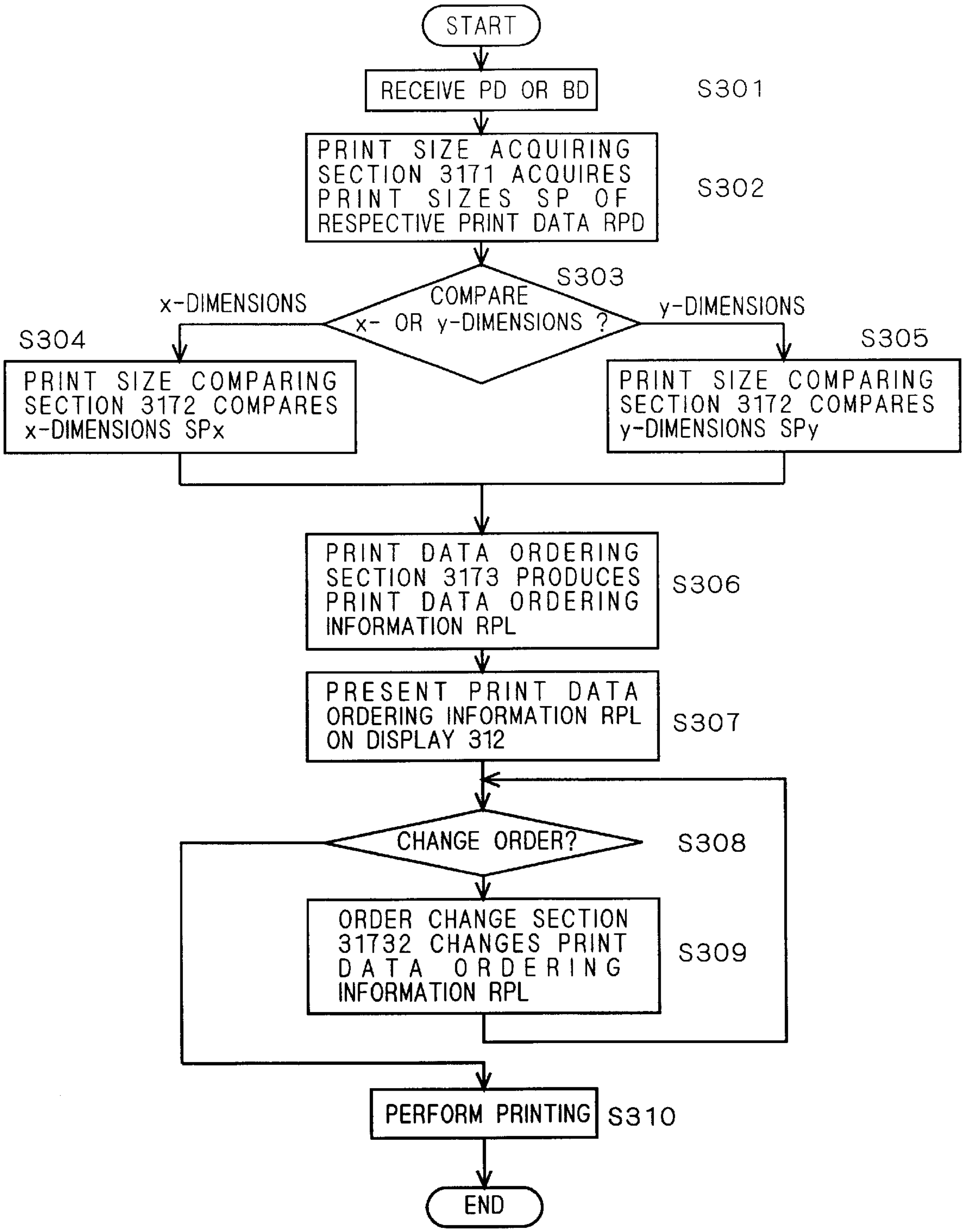
FIG. 12 is a flowchart for illustrating, especially, an operation of the controller of FIG. 11.

FIG. 12 is a flowchart for illustrating the operation of the printing system 300 and, more particularly, the operation of the controller 301.

In Step S301, the controller 301 receives the plurality of page data PD or book data BD produced by the image processing terminals 304. The page data PD or book data BD produced using application software not shown in the image processing terminals 304 are transmitted through the network 303 to the controller 301. The controller 301 stores the received page data PD or book data BD in the storage section 316.

In this step, the queue 3174 stores the order in which the page data PD or book data BD are stored as well as the names of the page data PD or book data BD in the form of the ordering information IL.

In Step S302, the print size acquiring section 3171 causes the print image size acquiring section 31711 or the page size acquiring section 31712 to perform its function upon the plurality of print data RPD obtained by rasterizing the plurality of page data PD or book data BD in the RIP section (not shown) of the controller 301, to thereby acquire the print sizes SP of the respective print data RPD. It is assumed in this case that the print size acquiring section 3171 causes the print image size acquiring section 31711 to function, thereby to acquire and store the x- and y-dimensions of the area occupied by the print image represented by each of the print data RPD as the print size SP.

When the print size acquiring section 3171 causes the page size acquiring section 31712 to function to acquire the print sizes SP, the page size acquiring section 31712 analyzes each of the page data PD or book data BD before the rasterization into the print data RPD to retrieve a description about a page size contained therein. The print size acquiring section 3171 may cause the page size acquiring section 31712 to acquire and store the description about the retrieved page size as the print size SP.

In Step S303, the print size comparing section 3172 prompts the operator of the controller 301 to make a selection between dimensions along x- and y-axes (referred to hereinafter as x- and y-dimensions) for comparison between the print sizes SP. The print size comparing section 3172 displays a screen for prompting the selection between the x- and y-dimensions for the comparison on the display 312 and waits for a select command of the operator.

As a result, if the x-dimensions are selected for the comparison between the print sizes SP, the process proceeds to Step S304. If the y-dimensions are selected for the comparison between the print sizes SP, the process proceeds to Step S305.

In response to the selection in Step S303, the print size comparing section 3172 makes a comparison between the x-dimensions SPx of the respective print sizes SP stored in the print size acquiring section 3171 in Step S304. A technique for the comparison includes, for example, comparing an x-dimension SPx with a reference x-dimension SPx of a particular print size SP, and comparing the x-dimension SPx of each of the print sizes SP with the other x-dimensions SPx in a round-robin manner. As a result of comparison, information about a relation between the x-dimensions SPx is transmitted to the print data ordering section 3173.

In response to the selection in Step S303, the print size comparing section 3172 makes a comparison between the y-dimensions SPy of the respective print sizes SP in Step S305. Step S305 is similar in process to Step S304 except the direction in which comparison is made, and will not be described herein. As a result of comparison, information about a relation between the y-dimensions SPy is transmitted to the print data ordering section 3173.

In Step S306, the print data ordering section 3173 produces the print data ordering information RPL, based on the result of comparison in Step S304 or S305. Based on the information about the relation between the x-dimensions SPx obtained in Step S304 or between the y-dimensions SPy obtained in Step S305, the print data ordering section 3173 orders the print data RPD corresponding to the print sizes SP including the x-dimensions SPx or the y-dimensions SPy.

For example, if the comparison between x-dimensions SPx21, SPx22, SPx23 of respective print data RPD21, RPD22, RPD23 shows a relation: SPx23>SPx21>SPx22, the print data ordering section 3173 regards the relation between print sizes SP21, SP22, SP23 of the respective print data RPD21, RPD22, RPD23 as SP23>SP21>SP22 to produce the print data ordering information RPL containing the order: RPD23, RPD21, and RPD22.

By referencing a permissible limit C contained in the permissible limit table 31731, the print data ordering section 3173 can produce the print data ordering information RPL which permits the output of the print data RPD having a smaller print size SP prior to the output of the print data RPD having a greater print size only when the difference therebetween is not significant.

For example, if print data RPD24 and RPD25 having respective x-dimensions SPx24 and SPx25 are stored in the controller 301 in the order: RPD24 and RPD25 but the result of comparison between the x-dimensions SPx24 and SPx25 in Step S304 shows a relation: SPx25>SPx24, the print data ordering section 3173 typically produces the print data ordering information RPL containing the order of output: RPD25, RPD24. However, when the result of comparison between the x-dimensions SPx24 and SPx25 of the respective print data RPD24 and RPD25 falls within the permissible limit C designated by the operator of the controller 301 or satisfies.

$$|SPx24-SPx25|\leq C \quad (5)$$

then the print data ordering information RPL containing the order stored in the storage section 316 of the controller 301, rather than the relation obtained in Step S204, is produced. In Expression (5), the absolute value of the result of comparison between the x-dimensions is used for judgment as to whether or not the difference falls within the permissible limit C.

After the print data ordering information RPL is produced in Step S306, the order change section 31732 in the print data ordering section 3173 presents the print data ordering information RPL on the display 312, and waits for a correction by the operator.

If the operator judges that it is necessary to correct the displayed print data ordering information RPL, the process proceeds to Step S309. In Step S309, the operator controls the input section 313 to manipulate the ordering of the print data ordering information RPL presented on the display 312. After the operator completes the correction of the print data ordering information RPL, the process proceeds to Step S310. If a further correction of the print data ordering information RPL is needed, the process in Step S309 is repeated.

If the operator judges that output is allowed using the print data ordering information RPL presented on the display 312, the process proceeds to Step S310. The print data ordering section 3173 transmits the produced print data ordering information RPL to the queue 3174. The queue 3174 substitutes the print data ordering information RPL transmitted thereto for the ordering information IL stored in Step S301. The queue 3174 reads the print data RPD in the order contained in the print data ordering information RPL from the storage section 316, and transmits the print data RPD in the same order to the digital printing press 302. When the digital printing press 302 receives the print data RPD through the communication line CL, the control section 321 in the digital printing press 302 converts the print data RPD into the binary half-tone data RPDD and transmits the binary half-tone data RPDD to the printing section 324. The sheets 326 of the size corresponding to the print size of the print data RPD are fed from the paper feed section 322 through the transport path 323 to the printing section 324. The printing section 324 transfers the print image represented by the binary half-tone data RPDD onto the sheets 326, whereby the printed sheets 327 are ejected into the stocker 325. The digital printing press 302 repeatedly perform the above-mentioned operation on the transmitted print data RPD, thereby to store the stack 328 of the printed sheets 327 in the stocker 325. When the transmission of the print data RPD from the controller 301 is completed, the digital printing press 302 stops operating, and the processes shown in FIG. 12 are completed.

FIGS. 13A through 13D illustrate that the controller 301 orders the print data RPD in the operation shown in the flowchart of FIG. 12.

FIG. 13A shows job data JDa, JDb, JDc and JDd (referred to collectively as job data JD) stored in the storage section 316 as arranged in the order inputted from the image processing terminals 304 in Step S301. Each of the job data JD includes a group of some of the print data RPD. It is assumed that the job data JDa includes print data RPDa having the "A4" size, the job data JDb includes print data RPDb having the "A3" size, the job data JDc includes print data RPDc having the "B5" (JIS B5) size, and the job data JDd includes print data RPDd having the "B4" (JIS B4) size. FIG. 13B shows the ordering information IL produced initially in the queue 3174. Prior to the rasterization of the page data PD, the queue 3174 produces the ordering information IL based on the order in which the book data BD are stored in the storage section 316. At this time, the ordering information IL produced by the queue 3174 contains the order in which the book data BD are stored in the storage section 316, and has not yet been processed to prevent the stacks 328 from falling apart in the stocker 325.

In Step S302, the print size acquiring section 3171 acquires the print sizes SP of the print data RPD constituting the job data JD, respectively. Since the job data JDa, JDb, JDc and JDd include the print data RPDa, RPDb, RPDc and RPDd having the "A4," "A3," "B4," and "B5" sizes, respectively, as mentioned above, the print size acquiring section 3171 acquires and stores the print size SPa (x=210, y=297) for the print data RPDa, the print size SPb (x=297, y=420) for the print data RPDb, the print size SPc (x=257, y=364) for the print data RPDc, and the print size SPd (x=182, y=257) for the print data RPDd. The above-mentioned dimensions x and y are in millimeters (mm).

In Step S303, the operator of the controller 301 selects the x- or y-dimensions for the comparison between the print sizes SP. The print size comparing section 3172 produces a display for prompting the selection of the x- or y-dimensions for the comparison. Then, the operator controls the input section 313 to respond to the prompt, whereby the selection in Step S303 is made. It is assumed in this case that the y-dimensions of the print sizes SP are selected for the comparison.

In Step S305, the print size comparing section 3172 reads the print sizes SP stored in the print size acquiring section 3171, and makes a comparison between the y-dimensions of the respective print sizes SP. Specifically, the print size comparing section 3172 reads the print sizes SPa, SPb, SPc and SPd, and makes a comparison between the y-dimensions of the respective print sizes SPa, SPb, SPc and SPd to determine a relation between the print sizes SPa, SPb, SPc and SPd. The print sizes SPa, SPb, SPc and SPd acquired by the print size acquiring section 3171 include respective y-dimensions SPay=297 (mm), SPby=420 (mm), SPcy=364 (mm) and SPdy=257 (mm). The print size comparing section 3172 compares these y-dimensions SPay, SPby, SPcy and SPdy to derive a relation: SPby>SPcy>SPay>SPdy.

In Step S306, the print data ordering section 3173 produces the print data ordering information RPL, based on the relation between the dimensions of the print sizes SP obtained as a result of the comparison by the print size comparing section 3172. Since the relation between the y-dimensions of the print sizes SP obtained in Step S305 is SPby>SPcy>SPay>SPdy as mentioned above, the print data ordering section 3173 regards the relation between the print sizes SP as SPb>SPc>SPa>SPd to determine the order of output of the job data JD corresponding to the print sizes SP, thereby producing the print data ordering information RPL.

In this process, the print data ordering section 3173 references the permissible limit table 31731. If the difference between the print sizes SP falls within the permissible limit C, the relation between the print sizes SP determined in Step S305 may be changed. For purposes of simplification, it is assumed that the permissible limit C=0 and there is no change in the relation determined in Step S305.

FIG. 13C shows the job data JD as ordered by the print data ordering section 3173. As shown in FIG. 13C, the order of output of the job data JD is the descending order of the print sizes, unlike the order shown in FIG. 13A. This corresponds to the relation between the print sizes A3>B4>A4>B5. This order of output results in the descending order of the sizes of the printed sheets 327 from the bottom when the stacks 328 are accumulated in the stocker 325 to prevent the stack falling apart.

In Step S307, the print data ordering section 3173 presents the produced print data ordering information RPL on the display 312, and waits for a change in the order by the operator.

Figure 14:
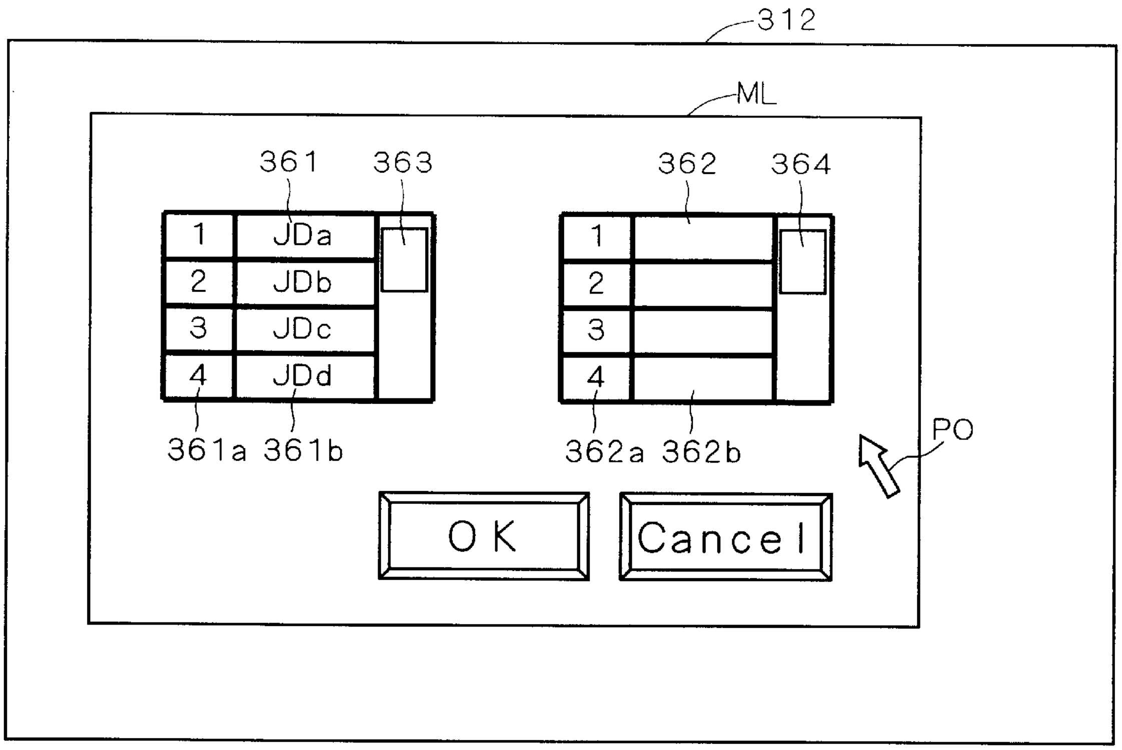
FIG. 14 shows an order change menu presented on a display.

FIG. 14 shows an order change menu ML for allowing the operator to change the print data ordering information RPL as presented on the display 312 by the print data ordering section 3173. The order change menu ML comprises a before-change print data output order display field 361, an after-change print data output order display field 362, an OK button 365, and a cancel button 366.

The before-change print data output order display field 361 is to display the print data ordering information RPL produced in Step S306. The before-change print data output order display field 361 comprises a plurality of sequence number fields 361*a* and a plurality of print data name display fields 361*b*, and presents the contents of the print data ordering information RPL. The sequence number fields 361*a* show the order of output, and the print data name display fields 361*b* show print data names or job data names.

The before-change print data output order display field 361 has a scroll bar 363. If there are a large number of sequence number fields 361*a* or print data name display fields 361*b*, the operator can manipulate the scroll bar 363 using a pointer PO to view all of the print data ordering information RPL.

The after-change print data output order display field 362 is to allow the operator to enter a change, if desired, in the contents of the print data ordering information RPL. The after-change print data output order display field 362 comprises a plurality of sequence number fields 362*a* and a plurality of print data name entry fields 362*b*. The sequence number fields 362*a*, similar to the sequence number fields 361*a*, show the order of output. The print data name entry fields 362*b* are to accept an operator's entry of a print data name or job data name whose place in the order is intended to change. The operator controls the pointer PO through the input section 313 to drag and drop a print data name or job data name presented in the before-change print data output order display field 361 into a print data name entry field 362*b* corresponding to a desired sequence number field 362*a* in the after-change print data output order display field 362, thereby changing the print data ordering information RPL.

The after-change print data output order display field 362 also has a scroll bar 364. If there are a large number of sequence number fields 362*a* or print data name entry fields 362*b*, the operator can manipulate the scroll bar 364 using the pointer PO to view a change in all of the print data ordering information RPL.

To perform printing based on the print data ordering information RPL displayed in the before-change print data output order display field 361, the operator clicks the OK button 365 while leaving the after-change print data output order display fields 362 blank. If the operator wants to change the order, the operator carries out desired ordering in the after-change print data output order display field 362 and thereafter clicks the OK button 365. In response to the clicking of the OK button 365, the print data ordering section 3173 ends the displaying of the order change menu ML, and transmits the print data ordering information RPL to the queue 3174. To abort the change in the order of the print data, the operator clicks the cancel button 366. In response to the clicking of the cancel button 366, the print data ordering section 3173 also ends the displaying of the order change menu ML. Then, the print data ordering section 3173 judges that printing is to be done based on the print data ordering information RPL displayed in the before-change print data output order display field 361 to transmit the print data ordering information RPL to the queue 3174.

Another technique of manipulating the ordering includes, for example, designating a print data name whose place in the order is intended to change, and inserting the print data name into a desired place in the order of the print data being displayed based on the print data ordering information RPL on the display.

It is assumed in this case that no change is made to the print data ordering information RPL, and the process proceeds to Step S310. In Step S310, the queue 3174 receives the print data ordering information RPL produced by and transmitted from the print data ordering section 3173, and substitutes the print data ordering information RPL for the ordering information IL having been stored therein. FIG. 13D shows the print data ordering information RPL produced by the print data ordering section 3173 and stored in the queue 3174. The queue 3174 transmits the job data JD stored in the storage section 316 in the order defined by the print data ordering information RPL to the digital printing press 302. Specifically, the queue 3174 reads the job data JD in the order: JDb, JDc, JDa and JDd from the storage section 316, and transmits the job data JD in the same order through the communication line CL to the digital printing press 302.

Figure 15A:
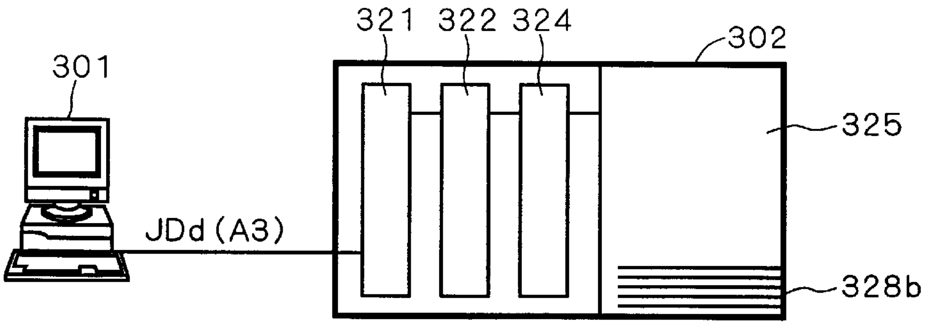
FIGS. 15A through 15C illustrate the status of a digital printing press when the operation shown in the flowchart of FIG. 12 is executed.

The digital printing press 302 prints the job data JD in the order received. The control section 321 of the digital printing press 302 converts the plurality of print data RPDb included in the received job data JDb into respective binary half-tone data RPDDb, and transmits the binary half-tone data RPDDb to the printing section 324. Since the print size of the plurality of print data RPDb included in the job data JDb is "A3," the control section 321 causes the paper feed section 322 to feed sheets 326*b* of the "A3" size through the transport path 323 to the printing section 324. The printing section 324 transfers the binary half-tone data RPDDb onto the fed sheets 326*b* of the "A3" size. Resultant printed sheets 327*b* pass through the transport path 323 into the stocker 325. In this manner, the control section 321, the paper feed section 322, the transport path 323 and the printing section 324 operate repeatedly to accumulate a stack 328*b* for the job data JDb in the stocker 325. The result is shown in FIG. 15A.

Figure 15B:
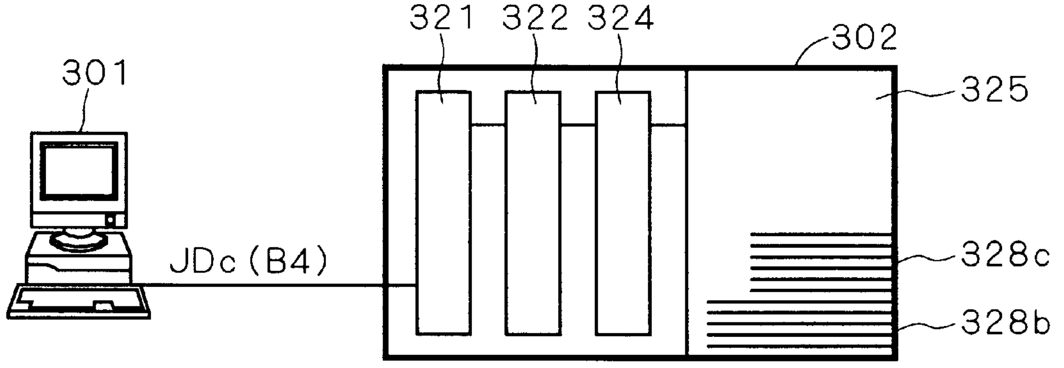

Likewise, upon receipt of the job data JDc, the digital printing press 302 transfers a print image represented by the plurality of print data RPDc onto sheets 326*c* corresponding to the "B4" print size of the print data RPDc included in the job data JDc, to accumulate a stack 328*c* in the stocker 325, as shown in FIG. 15B. Although the stack 328*b* has already been accumulated in the stocker 325, the stack falling apart does not occur because the "A3" size of the printed sheets 327*b* in the stack 328*b* is greater than the "B4" size of printed sheets 327*c* in the stack 328*c*.

Figure 15C:
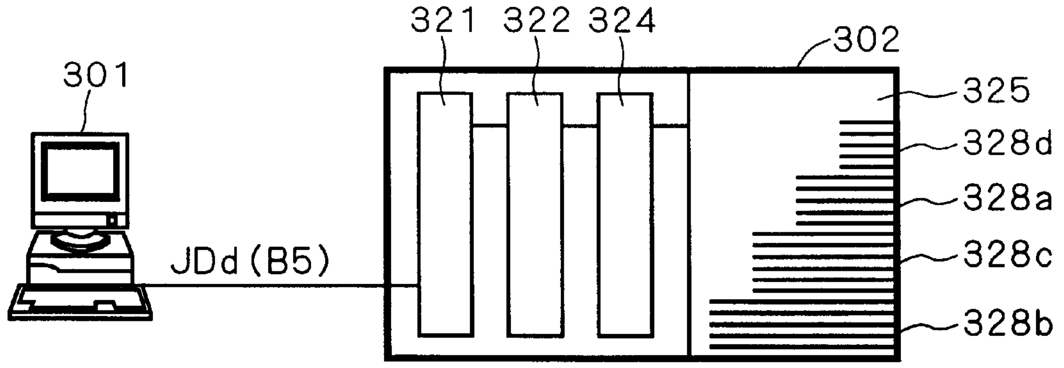

The digital printing press 302 also prints the job data JDa and JDd using sheets 326*a* and 326*d* having the "A4" and "B5" sizes corresponding to the print data RPDa and RPDd included in the job data JDa and JDd, respectively, to accumulate stacks 328*a* and 328*d* in the stocker 325, as shown in FIG. 15C. The stacks 328 accumulated in the stocker 325 do not fall apart since the sizes of the printed sheets 327*a*, 327*b*, 327*c* and 327*d* in the respective stacks 328*a*, 328*b*, 328*c* and 328*d* have a relation: 327*b*>327*c*>327*a*>327*d*.

As described above, the controller 301 shown in FIGS. 10 and 11 operates as illustrated in the flowchart of FIG. 12 to provide a printing system capable of compatibility between the prevention of the stack falling apart and the continuous printing.

Modifications

Figure 16:
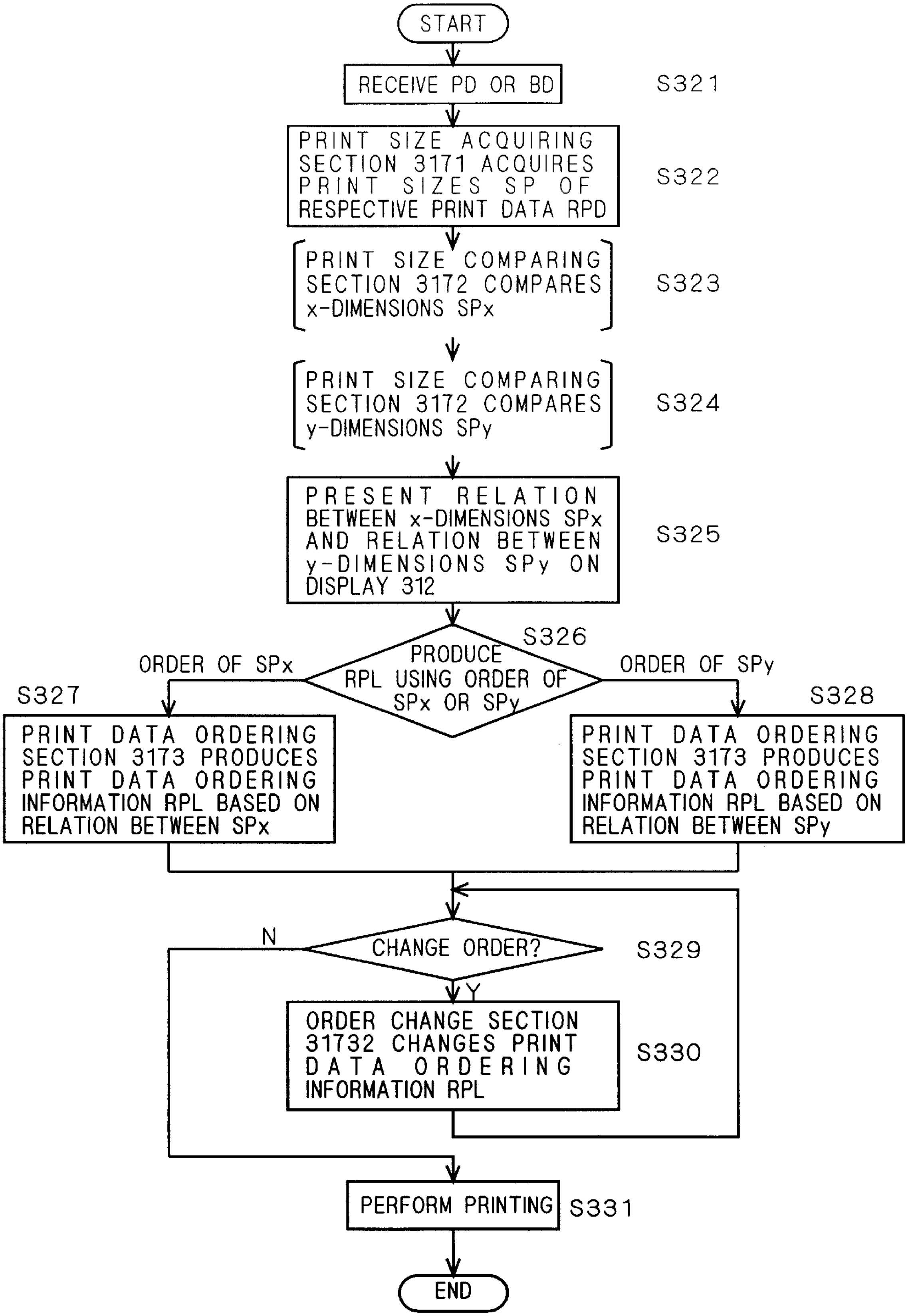
FIG. 16 is a flowchart for illustrating a modification of the present invention.

The controller 301 may perform an operation shown in the flowchart of FIG. 16. Steps S321 and S322 of FIG. 16 are similar to Steps S301 and S302 in the flowchart of FIG. 12, and will not be described herein.

In Step S323, the print size comparing section 3172 makes a comparison between the x-dimensions of the respective print sizes SP acquired by the print size acquiring section 3171. The details of the process in Step S323 are similar to those in Step S304 of FIG. 12. Specifically, the relation between the x-dimensions SPx of the respective print sizes SP is determined.

In Step S324, the print size comparing section 3172 makes a comparison between the y-dimensions of the respective print sizes SP acquired by the print size acquiring section 3171. The details of the process in Step S324 are similar to those in Step S305 of FIG. 12. Specifically, the relation between the y-dimensions SPy of the respective print sizes SP is determined.

In Step S325, the print size comparing section 3172 presents the relation between the x-dimensions SPx obtained in Step S323 and the relation between the y-dimensions SPy obtained in Step S324 on the display 312. The operator can make a selection between referencing the x-dimensions SPx and referencing the y-dimensions SPy of the print sizes in Step S326 for production of the print data ordering information RPL.

As an example, it is assumed that only sheets having the "A3" and "A4" sizes are usable for printing in the digital printing press 302. Since both the x-dimensions SPx of these sizes are SPx=297 (mm), there is no inequality between the x-dimensions SPx in Step S323, and the x-dimensions SPx are displayed in Step S325 substantially in the order in which the print data RPD are stored in the storage section 316. However, because of the difference in y-dimension SPy between the "A3" sheets (SPy=420 (mm)) and the "A4" sheets (SPy=210 (mm)), there is an inequality between the y-dimensions SPy. This allows the determination of the order of the print data different from the order in which the print data RPD are stored in the storage section 316.

As described above, in Step S326, the operator can select the production of the print data ordering information RPL using the x-dimensions SPx or the y-dimensions SPy in accordance with the displayed result.

If the operator selects the production of the print data ordering information RPL using the x-dimensions SPx, the process proceeds to Step S327. In Step S327, the print data ordering section 3173 produces the print data ordering information RPL based on the relation between the x-dimensions SPx compared by the print size comparing section 3172. The process in Step S327 is similar to that in Step S306 of FIG. 12, and will not be described herein.

If the operator selects the production of the print data ordering information RPL using the y-dimensions SPy, the process proceeds to Step S328. In Step S328, the print data ordering section 3173 produces the print data ordering information RPL based on the relation between the y-dimensions SPy compared by the print size comparing section 3172. The process in Step S328 is similar to that in Step S306 of FIG. 12, and will not be described herein.

The processes in Steps S329 through S331 are similar to those in Steps S307 through S310 of FIG. 12, and will not be described herein.

As described above, the controller 301 shown in FIGS. 10 and 11 operates as illustrated in the flowchart of FIG. 16 to provide a printing system capable of compatibility between the prevention of the stack falling apart and the continuous printing.

The present invention is not limited to the above-mentioned preferred embodiments.

The controller and the digital printing press are illustrated as separate devices in the above-mentioned preferred embodiments, but may be integrated together.

The present invention may be embodied in such a manner that the image processing terminals have the same functions as the controller to control the digital printing press through the network.

For comparison between the first print size and the second print size, the control section may reference the permissible limit table based on the types or sizes of the sheets loaded in the digital printing press 2 without the need for the designation by the operator.

While the invention has been described in detail, the foregoing description is in all aspects illustrative and not restrictive. It is understood that numerous other modifications and variations can be devised without departing from the scope of the invention.

What is claimed is:

1. A printing system comprising:

a) a printing apparatus including a-1) a printing section for continuously printing a plurality of print data on a plurality of sheets of paper to provide a plurality of printed sheets, a-2) a stock section including at least one stocker, and a-3) an ejecting mechanism for ejecting said plurality of printed sheets into said stock section; and b) a controller including b-1) an acquiring element for acquiring print sizes corresponding respectively to said plurality of print data, b-2) a comparing element for making a comparison between said print sizes, and b-3) a control element for controlling said printing section and said ejecting mechanism based on a result of the comparison by said comparing element to provide a stable stack including printed sheets of different sheet sizes in said stock section.

2. The printing system according to claim 1, wherein said comparing element makes a comparison between a first print size of first printed sheets lying in a top position of said stable stack and a second print size of second print data, and wherein said control element determines whether or not to eject second printed sheets on which said second print data is printed onto said stable stack in accordance with said result of the comparison.

3. The printing system according to claim 2, wherein said control element comprises an ejecting element for allowing ejection of said second printed sheets onto said stable stack if a first condition is satisfied, said first condition being such that said second print size is less than said first print size.

4. The printing system according to claim 3, wherein said control element allows said ejecting element to eject said second printed sheets onto said stable stack if a second condition is satisfied, said second condition being such that said second print size is greater than said first print size and a difference between said first and second print sizes is less than a predetermined threshold value.

5. The printing system according to claim 4, wherein said at least one stocker includes a first stocker and a second stocker, wherein said stable stack is provided in said first stocker, and wherein said control element allows said ejecting element to eject said second printed sheets into said second stocker if neither said first condition nor said second condition is satisfied.

6. The printing system according to claim 5, wherein said acquiring element acquires said second print size as a new value of said first print size for the stocker in which said second printed sheets are stored, after said stable stack is provided, and wherein said comparing element makes a comparison between said new value of said first print size and a new value of said second print size.

7. The printing system according to claim 4, wherein said control element stops printing said second print data when neither said first condition nor said second condition is satisfied in said stock section.

8. The printing system according to claim 1, wherein said control element comprises:

a sorting element for sorting the print sizes of said plurality of print data to determine printing order, based on said result of the comparison between said print sizes by said comparing element; and an element for controlling said printing section to print said plurality of print data in said printing order.

9. The printing system according to claim 8, wherein said sorting element comprises a disabling element, said disabling elements disabling said sorting element for at least two print data when a difference between print sizes of said at least two print data compared by said comparing element is less than a threshold value.

10. The printing system according to claim 8, wherein said comparing element compares single dimensions of said plurality of print data with each other.

11. The printing system according to claim 1, wherein, when a group of lower printed sheets and a group of upper printed sheets adjacent to each other in said stable stack are observed, a difference obtained by subtracting the size of said upper printed sheets from the size of said lower printed sheets is greater than a predetermined threshold value.

12. A method of controlling a printing apparatus, said printing apparatus including a printing section for continuously printing a plurality of print data on a plurality of sheets of paper to provide a plurality of printed sheets, a stock section having at least one stocker, and an ejecting mechanism for ejecting said plurality of printed sheets into said stock section, said method comprising the steps of:

a) acquiring print sizes corresponding respectively to said plurality of print data;

b) making a comparison between said print sizes; and c) controlling said printing section and said ejecting mechanism based on a result of the comparison in said step b) to provide a stable stack including printed sheets of different sheet sizes in said stock section.

13. The method according to claim 12, wherein said step a) comprises the step of making a comparison between a first sheet size of first printed sheets lying in a top position of said stable stack and a second sheet size of second print data, and wherein said step c) comprises the step of determining whether or not to eject second printed sheets on which said second print data is printed onto said stable stack in accordance with said result of the comparison.

14. The method according to claim 12, wherein said step c) comprises the steps of:

sorting the print sizes of said plurality of print data to determine printing order, based on said result of the comparison between said print sizes by said comparing element; and controlling said printing section to print said plurality of print data in said printing order.

15. A controller for a printing apparatus, said printing apparatus including a printing section for continuously printing a plurality of print data on a plurality of sheets of paper to provide a plurality of printed sheets, a stock section including at least one stocker, and an ejecting mechanism for ejecting said plurality of printed sheets into said stock section, said controller comprising:

an acquiring element for acquiring print sizes corresponding respectively to said plurality of print data, a comparing element for making a comparison between said print sizes, and a control element for controlling said printing section and said ejecting mechanism based on a result of the comparison by said comparing element to provide a stable stack including printed sheets of different sheet sizes in said stock section.

16. The controller according to claim 15, wherein said comparing element makes a comparison between a first sheet size of first printed sheets lying in a top position of said stable stack and a second sheet size of second print data, and wherein said control element determines whether or not to eject second printed sheets on which said second print data is printed onto said stable stack in accordance with said result of the comparison.

17. The controller according to claim 15, wherein said control element comprises:

a sorting element for sorting the print sizes of said plurality of print data to determine printing order, based on said result of the comparison between said print sizes by said comparing element; and an element for controlling said printing section to print said plurality of print data in said printing order.

* * * * *

UNITED STATES PATENT AND TRADEMARK OFFICE

CERTIFICATE OF CORRECTION

PATENT NO. : 6,748,858 B2
DATED : June 15, 2004
INVENTOR(S) : Katsuya Yamaguchi

It is certified that error appears in the above-identified patent and that said Letters Patent is hereby corrected as shown below:

Title Page,
Item [56], References Cited, U.S. PATENT DOCUMENTS, please delete "5,771,433 A 6/1998 Kimijima" and "6,452,232 B1 9/2002 Adan";
FOREIGN PATENT DOCUMENTS, please delete
"KR 2000-0047907 7/2000"

Signed and Sealed this

Nineteenth Day of October, 2004

JON W. DUDAS
*Director of the United States Patent and Trademark Office*

UNITED STATES PATENT AND TRADEMARK OFFICE

CERTIFICATE OF CORRECTION

PATENT NO. : 6,748,858 B2 
APPLICATION NO. : 10/035445
DATED : June 15, 2004
INVENTOR(S) : Katsuya Yamaguchi It is certified that error appears in the above-identified patent and that said Letters Patent is hereby corrected as shown below:

Title page,
Item [56], References Cited, U.S. PATENT DOCUMENTS, delete
"6,452,232 B1 9/2002 Adan"; and
FOREIGN PATENT DOCUMENTS, delete "KR 2000-0047907 7/2000".

Signed and Sealed this

Twenty-fifth Day of July, 2006

JON W. DUDAS
*Director of the United States Patent and Trademark Office*